(12) United States Patent
Weerasooriya et al.

(10) Patent No.: US 10,106,725 B2
(45) Date of Patent: Oct. 23, 2018

(54) LIGHT CO-SOLVENT COMPOSITIONS

(71) Applicant: Board of Regents, The University of Texas System, Austin, TX (US)

(72) Inventors: Upali P. Weerasooriya, Austin, TX (US); Gary A. Pope, Cedar Park, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/365,170

(22) Filed: Nov. 30, 2016

(65) Prior Publication Data

US 2017/0145293 A1 May 25, 2017

Related U.S. Application Data

(62) Division of application No. 13/714,163, filed on Dec. 13, 2012.

(60) Provisional application No. 61/570,259, filed on Dec. 13, 2011.

(51) Int. Cl.
| | |
|---|---|
| *C09K 8/16* | (2006.01) |
| *C09K 8/60* | (2006.01) |
| *C09K 8/588* | (2006.01) |
| *C09K 8/594* | (2006.01) |
| *C09K 8/584* | (2006.01) |
| *E21B 43/16* | (2006.01) |

(52) U.S. Cl.
CPC .............. *C09K 8/588* (2013.01); *C09K 8/584* (2013.01); *C09K 8/594* (2013.01); *E21B 43/16* (2013.01)

(58) Field of Classification Search
CPC . C09K 8/04; C09K 8/58; C09K 8/584; C09K 8/588; Y10S 507/935; Y10S 507/937
USPC ......................... 507/261, 139, 266
See application file for complete search history.

(56) References Cited

U.S. PATENT DOCUMENTS

| | | | |
|---|---|---|---|
| 3,811,504 A | 5/1974 | Flournoy et al. |
| 4,101,425 A | 7/1978 | Young et al. |
| 4,293,428 A | 10/1981 | Gale et al. |
| 4,518,038 A | 5/1985 | Maddox et al. |
| 4,552,673 A | 11/1985 | Grolitzer et al. |
| 4,614,236 A | 9/1986 | Watkins et al. |
| 4,618,450 A | 10/1986 | Higgins |

(Continued)

FOREIGN PATENT DOCUMENTS

| | | |
|---|---|---|
| EP | 0459171 A1 | 12/1991 |
| WO | 2007141067 A1 | 12/2007 |

(Continued)

OTHER PUBLICATIONS

International Search Report and Written Opinion issued in Application No. PCT/US2012/069563, dated Mar. 28, 2013.

(Continued)

*Primary Examiner* — Aiqun Li
(74) *Attorney, Agent, or Firm* — Meunier Carlin & Curfman LLC

(57) ABSTRACT

Provided herein are inter alia non-surfactant aqueous compositions and methods having application in the field of enhanced oil recovery. In particular, non-surfactant compositions including light co-solvents and an alkali agent presented herein can be used, inter alia, for the recovery of a large range of crude oil compositions from challenging reservoirs.

13 Claims, 11 Drawing Sheets

(56) References Cited

U.S. PATENT DOCUMENTS

| | | |
|---|---|---|
| 4,722,396 A | 2/1988 | Balzer et al. |
| 4,775,489 A | 10/1988 | Watkins et al. |
| 5,114,599 A | 5/1992 | Debons et al. |
| 5,279,760 A | 1/1994 | Sato et al. |
| 6,148,913 A | 11/2000 | Collins |
| 6,225,267 B1 | 5/2001 | Eckard et al. |
| 7,629,299 B2 | 12/2009 | Berger et al. |
| 2006/0001011 A1 | 1/2006 | Wilson et al. |
| 2008/0010772 A1 | 1/2008 | Kong et al. |
| 2008/0045439 A1 | 2/2008 | Held et al. |
| 2008/0196893 A1 | 8/2008 | Berger et al. |
| 2009/0264329 A1 | 10/2009 | Underwood et al. |
| 2010/0069272 A1 | 3/2010 | Morvan et al. |
| 2010/0292110 A1 | 11/2010 | Pope et al. |
| 2011/0059873 A1 | 3/2011 | Weerasooriya et al. |
| 2011/0190174 A1 | 8/2011 | Weerasooriya et al. |
| 2011/0278004 A1 | 11/2011 | Ali et al. |
| 2011/0290482 A1 | 11/2011 | Weerasooriya et al. |
| 2012/0040880 A1 | 2/2012 | Rieth et al. |
| 2012/0097389 A1* | 4/2012 | Dwarakanath ........... C09K 8/58 166/270.1 |
| 2013/0081808 A1 | 4/2013 | Zeidani et al. |

FOREIGN PATENT DOCUMENTS

| | | |
|---|---|---|
| WO | 2008079855 A3 | 1/2009 |
| WO | 2011037954 A2 | 3/2011 |
| WO | 2011094442 A1 | 8/2011 |
| WO | 2012027757 A1 | 3/2012 |
| WO | 2012145274 A2 | 10/2012 |
| WO | 2012154376 A2 | 11/2012 |

OTHER PUBLICATIONS

International Search Report and Written Opinion issued in Application No. PCT/US2014/019592, dated May 26, 2014.

* cited by examiner

LIGHT CO-SOLVENT COMPOSITIONS

CROSS-REFERENCE TO RELATED APPLICATIONS

This application is a continuation of U.S. patent application Ser. No. 13/714,163, filed Dec. 12, 2012, which claims the benefit of U.S. Provisional Application No. 61/570,259 filed Dec. 13, 2011, which is hereby incorporated in its entirety and for all purposes.

BACKGROUND OF THE INVENTION

Enhanced Oil Recovery (abbreviated EOR) refers to techniques for increasing the amount of unrefined petroleum, or crude oil that may be extracted from an oil reservoir (e.g. an oil field). Using EOR, 40-60% of the reservoir's original oil can typically be extracted compared with only 20-40% using primary and secondary recovery (e.g. by water injection or natural gas injection) Enhanced oil recovery may also be referred to as improved oil recovery or tertiary recovery (as opposed to primary and secondary recovery).

Enhanced oil recovery may be achieved by a variety of methods including miscible gas injection (which includes carbon dioxide flooding), chemical injection (which includes polymer flooding, alkaline flooding and surfactant flooding), microbial injection, or thermal recovery (which includes cyclic steam, steam flooding, and fire flooding). The injection of various chemicals, usually as dilute aqueous solutions, has been used to improve oil recovery. Injection of alkaline or caustic solutions into reservoirs with oil that has organic acids or acid precursors naturally occurring in the oil will result in the production of soap (i.e. in situ generated soap) that may lower the interfacial tension enough to increase production. Injection of a dilute solution of a water soluble polymer to increase the viscosity of the injected water can increase the amount of oil recovered in some formations. Dilute solutions of surfactants such as petroleum sulfonates may be injected to lower the interfacial tension or capillary pressure that impedes oil droplets from moving through a reservoir. Special formulations of oil, water and surfactant microemulsions, have also proven useful. Application of these methods is usually limited by the cost of the chemicals and their adsorption and loss onto the rock of the oil containing formation.

Some unrefined petroleum contains carboxylic acids having, for example, $C_{11}$ to $C_{20}$ alkyl chains, including napthenic acid mixtures. The recovery of such "reactive" oils may be performed using alkali (e.g. NaOH or $Na_2CO_3$) in a surfactant composition. The alkali reacts with the acid in the reactive oil to form soap in situ. These in situ generated soaps serve as an additional source of surfactants enabling the use of much lower level of surfactants initially added to effect enhanced oil recovery (EOR). However, when the available water supply is hard, the added alkali causes precipitation of cations, such as $Ca^{+2}$ or $Mg^{+2}$. In order to prevent such precipitation an expensive chelant such as EDTA may be required in the surfactant composition. Alternatively, expensive water softening processes may be used.

Therefore, there is a need in the art for cost effective methods for enhanced oil recovery using chemical injection. Provided herein are methods and compositions addressing these and other needs in the art.

BRIEF SUMMARY OF THE INVENTION

The compositions provided herein include a light co-solvent, an alkali agent and a water-soluble polymer and are particularly useful for oil recovery under a broad range of reservoir conditions (e.g. high to low temperatures, high to low salinity, highly viscous oils). Compared to existing surfactant compositions used in the art, the non-surfactant aqueous compositions according to the embodiments provided herein are highly versatile and cost effective.

In a first aspect, the present invention provides a non-surfactant aqueous composition including a light co-solvent, a water-soluble polymer and an alkali agent.

In another aspect, an emulsion composition is provided including an unrefined petroleum phase and a non-surfactant aqueous phase. The non-surfactant aqueous phase includes a light co-solvent and an alkali agent.

In another aspect, a method of displacing an unrefined active petroleum material in contact with a solid material is provided. The method includes contacting an unrefined active petroleum material with a non-surfactant aqueous composition, wherein the unrefined active petroleum material is in contact with a solid material. The unrefined active petroleum material is allowed to separate from the solid material thereby displacing the unrefined active petroleum material in contact with the solid material.

In another aspect, a method of converting an unrefined active petroleum acid into a surfactant is provided. The method includes contacting an unrefined active petroleum material with the non-surfactant aqueous composition, thereby forming an emulsion in contact with the unrefined active petroleum material. An unrefined active petroleum acid within the unrefined active petroleum material is allowed to enter the emulsion, thereby converting the unrefined active petroleum acid into a surfactant.

DETAILED DESCRIPTION OF THE INVENTION

I. Definitions

Figure 1:
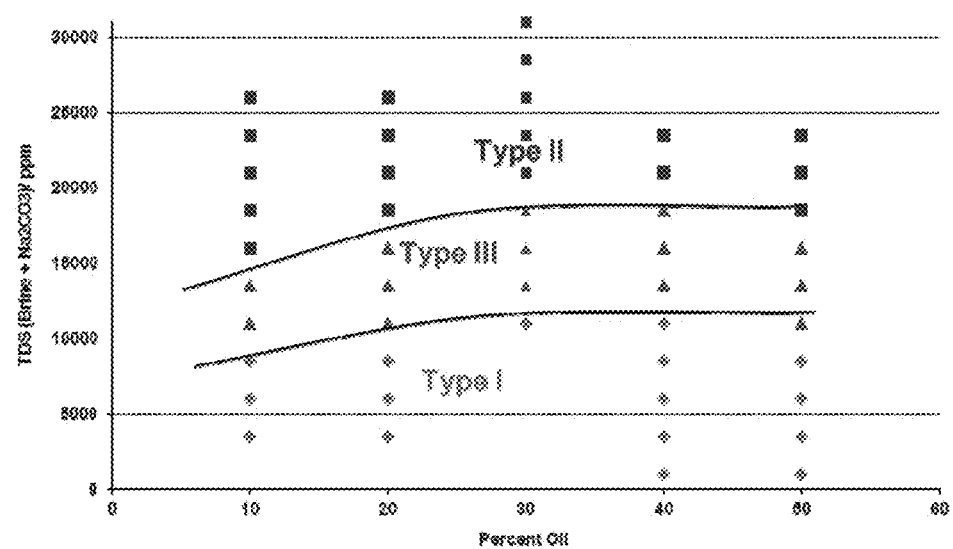
FIG. 1. Phase behavior activity (1.5% n-butyl-5EO) plot with Oil #1 @38° C.
Figure 2:
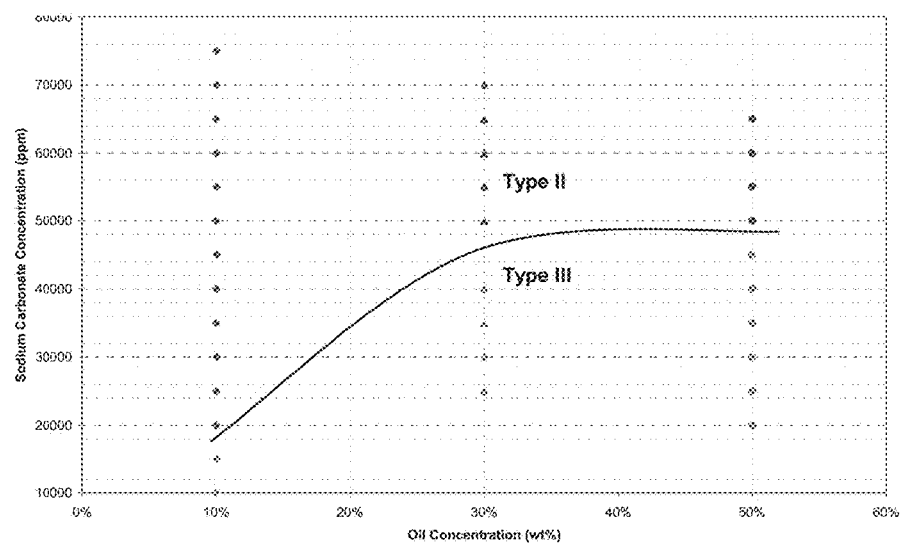
FIG. 2. Phase behavior activity (1% sec-butanol) plot with Oil #2 @65° C.
Figure 3A:
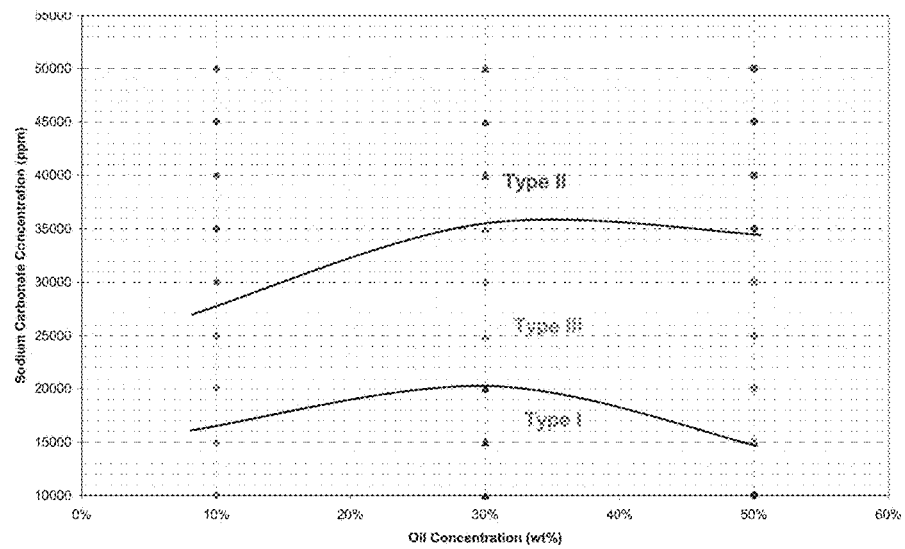
FIG. 3A. Phase behavior activity (1% iso-butyl-1EO) plot with Oil #2 at 85° C.
Figure 3B:
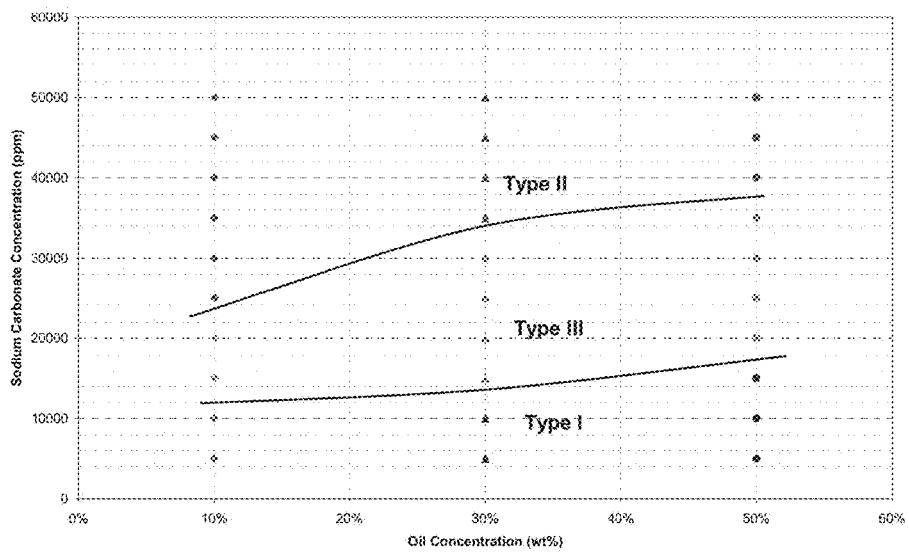
FIG. 3B. Phase behavior activity (1% iso-butyl-1EO) plot with Oil #2 at 65° C.
Figure 4:
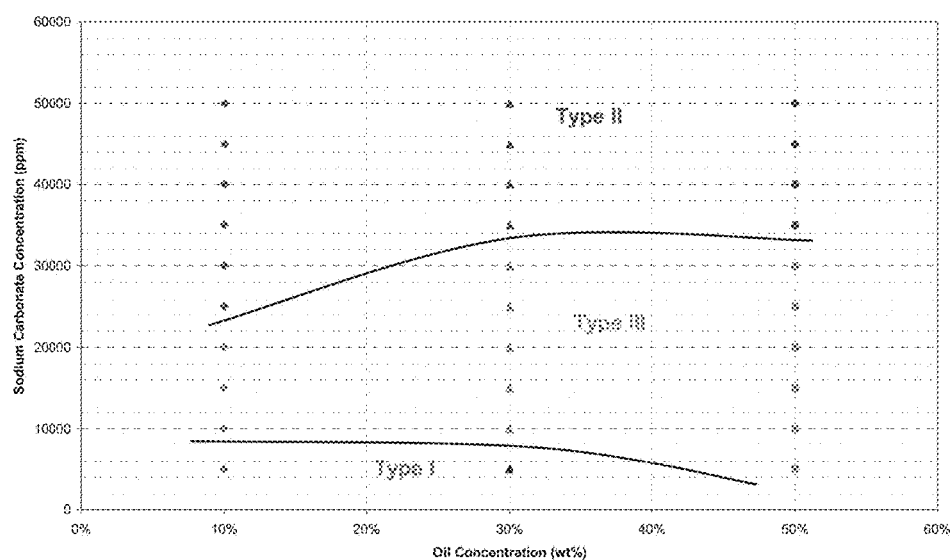
FIG. 4. Phase behavior activity (1% iso-butyl-1EO) plot with Oil #2 at 85° C.
Figure 5:
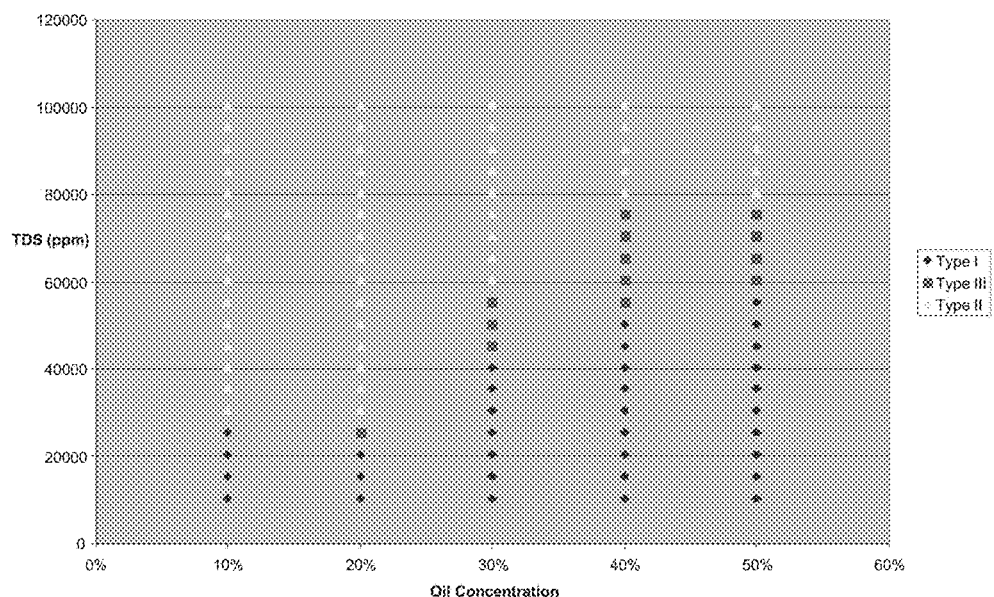
FIG. 5. Phase behavior activity plot (1% TEGBE) with Oil #3 at 55° C.
Figure 6A:
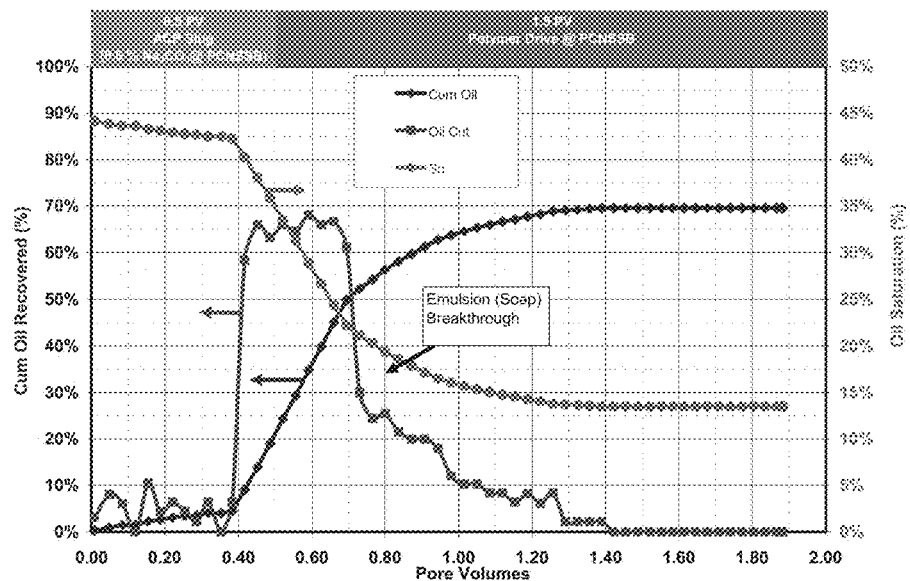
FIG. 6A. Oil recovery profile and FIG. 6B pressure drop plot for Oil 1 core flood.
Figure 6B:
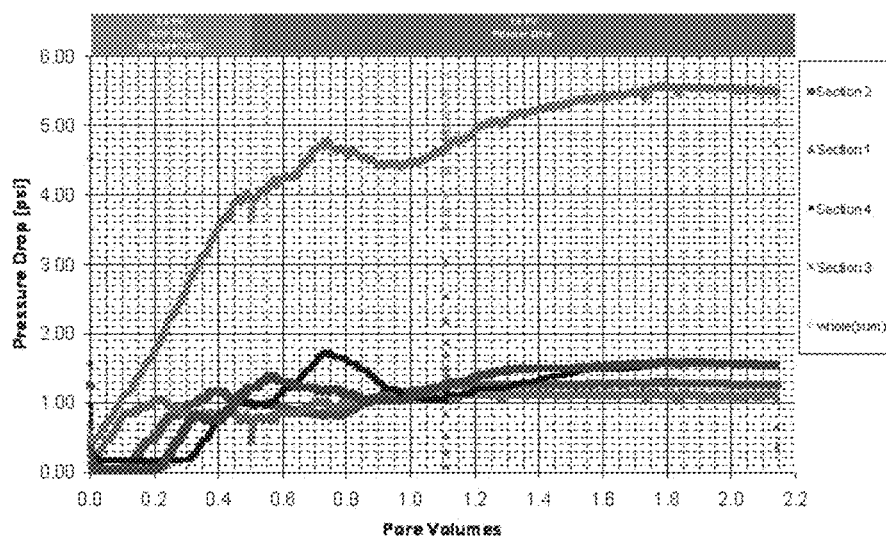
Figure 7A:
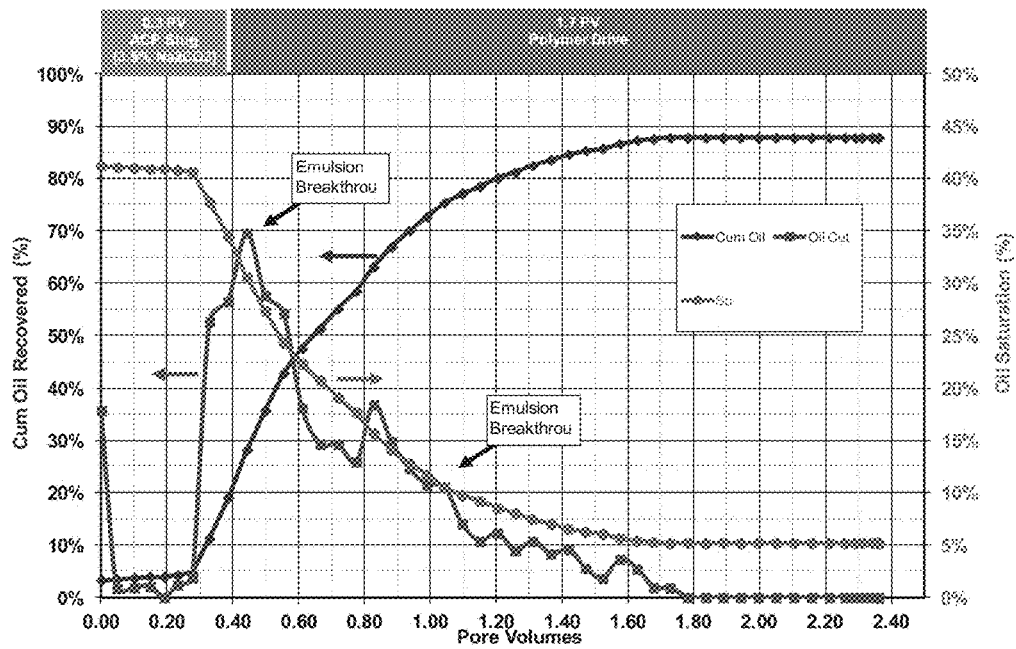
FIG. 7A. Oil recovery profile and FIG. 7B pressure drop plot for Oil 2 core flood.
Figure 7B:
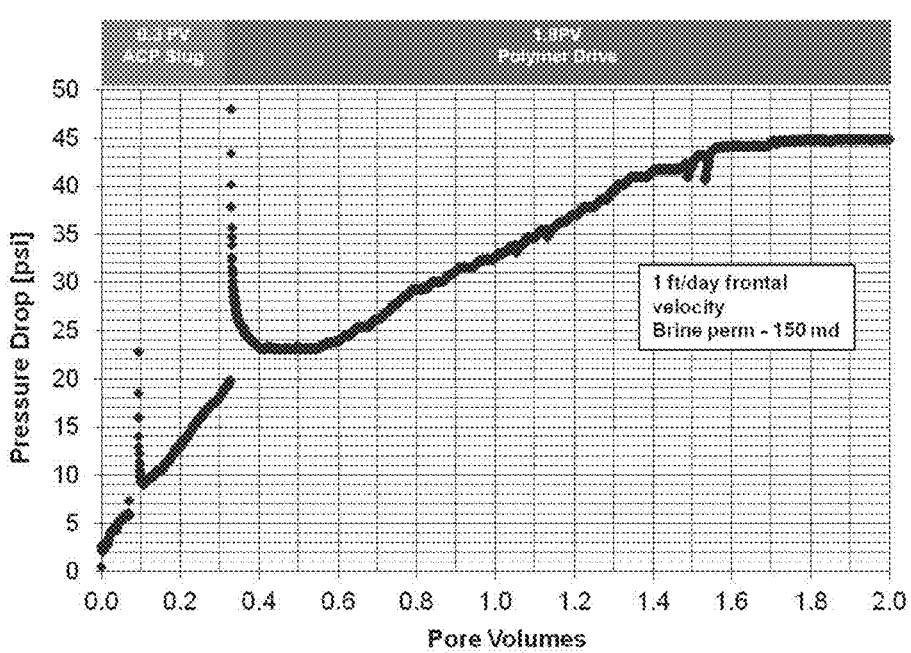
Figure 8A:
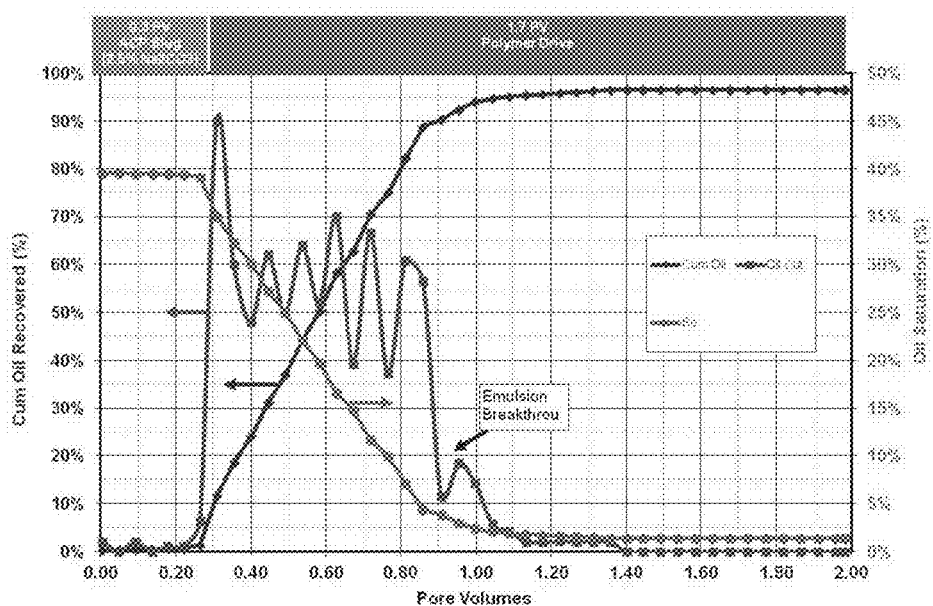
FIG. 8A. Oil recovery profile and FIG. 8B pressure drop plot for Oil 3 core flood.
Figure 8B:
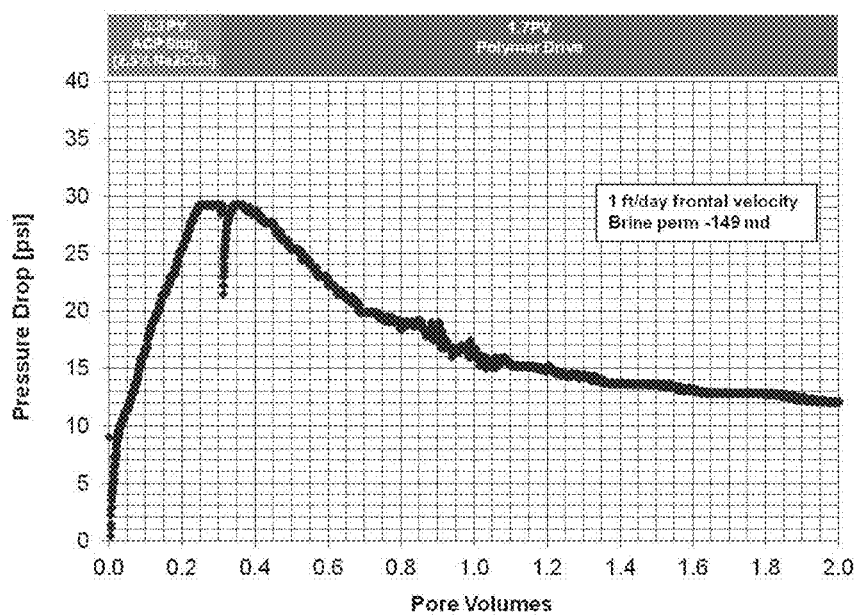
Figure 9A:
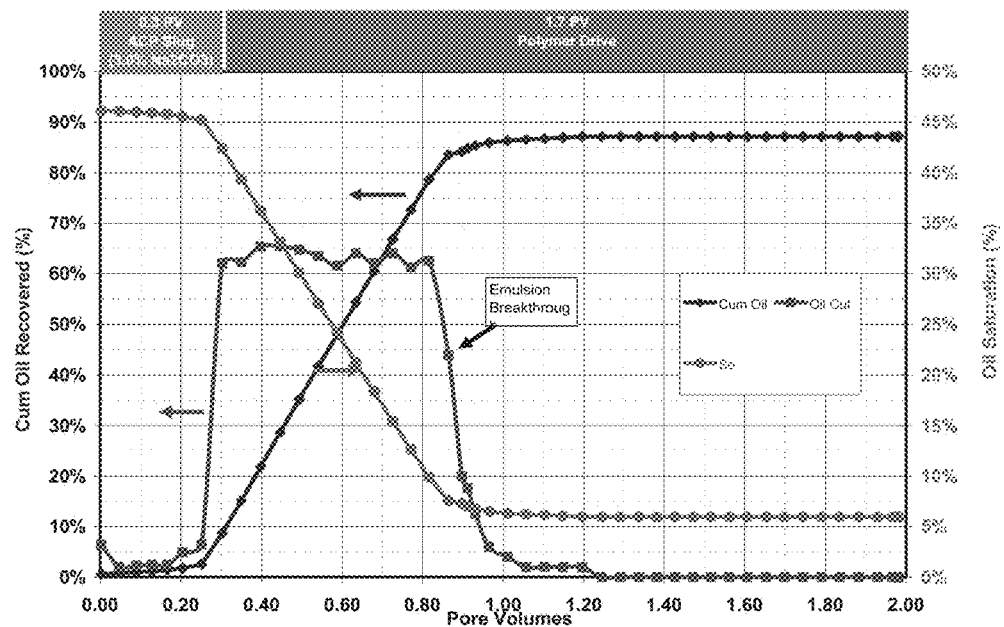
FIG. 9A. Oil recovery profile and FIG. 9B pressure drop plot for Oil 4 core flood.
Figure 9B:
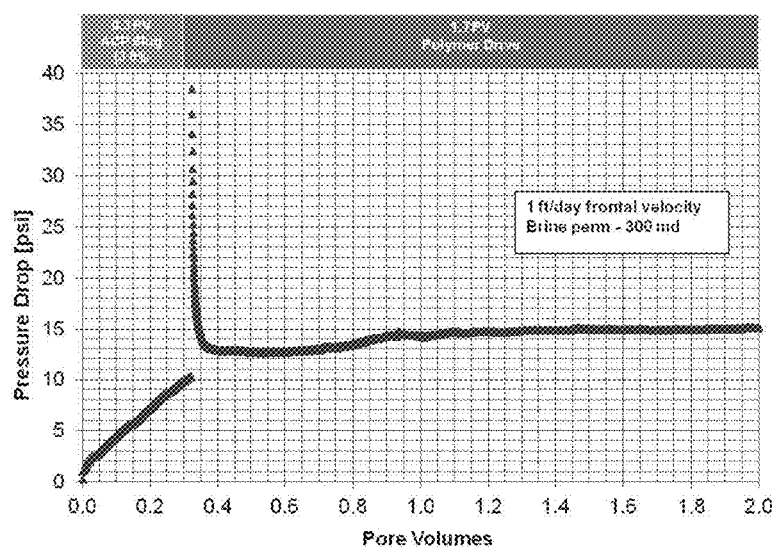
Figure 10A:
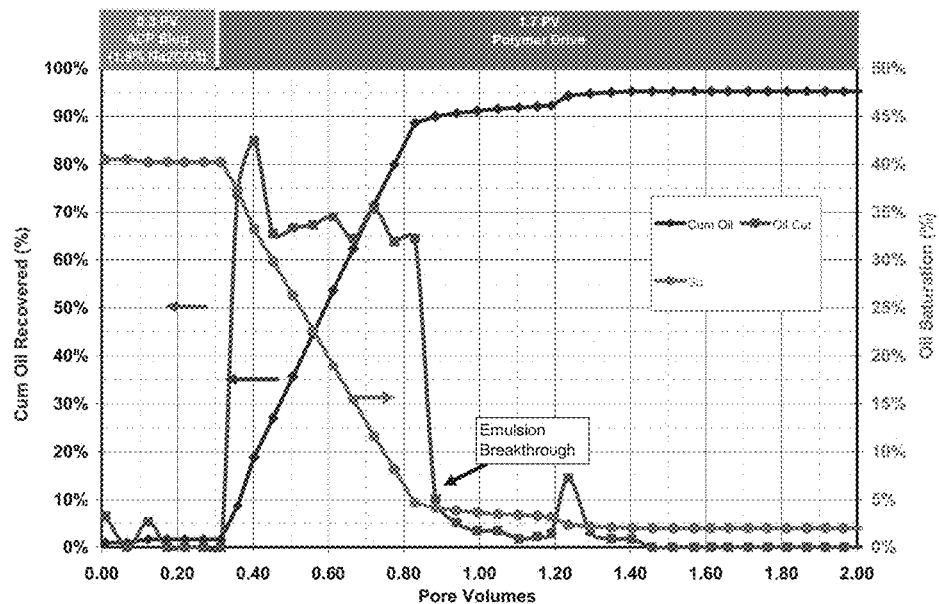
FIG. 10A. Oil recovery profile and FIG. 10B pressure drop plot for Oil 5 core flood.
Figure 10B:
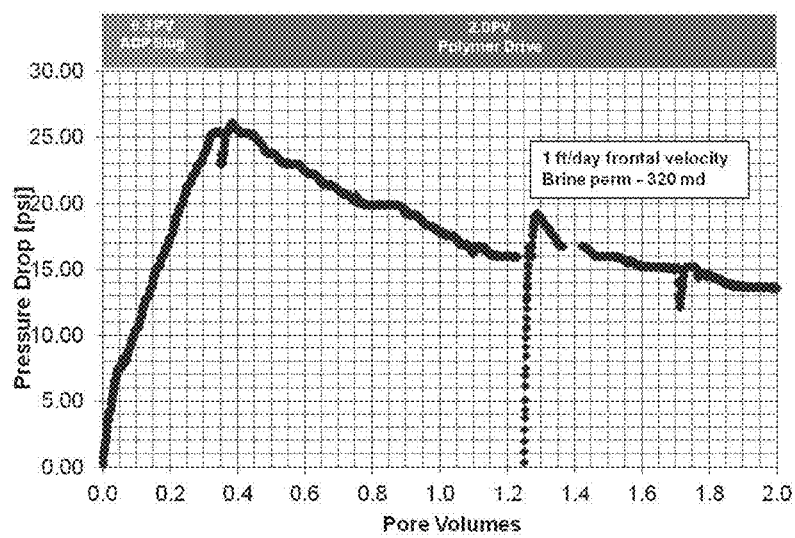
Figure 11A:
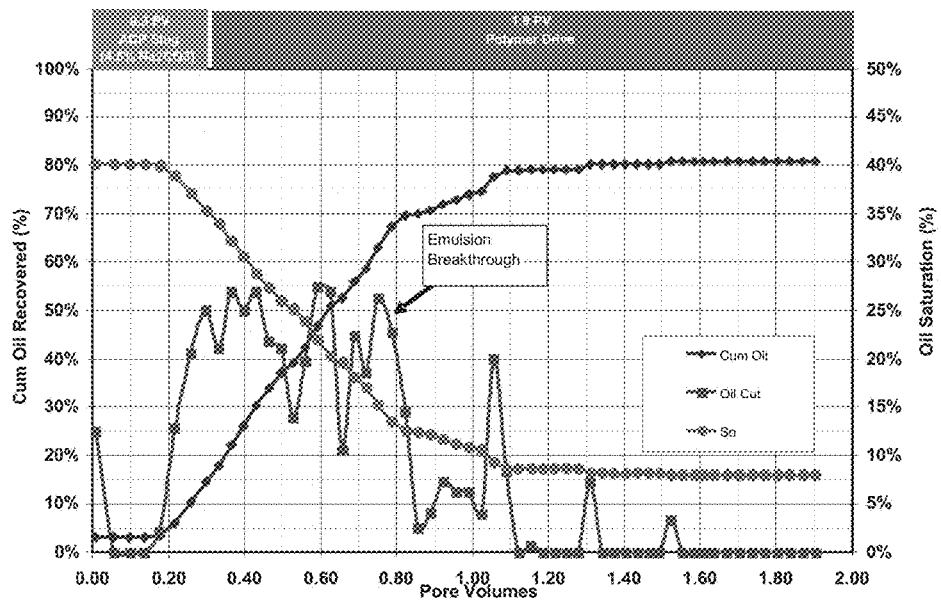
FIG. 11A. Oil recovery profile and FIG. 11B pressure drop plot for Oil 6 core flood.
Figure 11B:
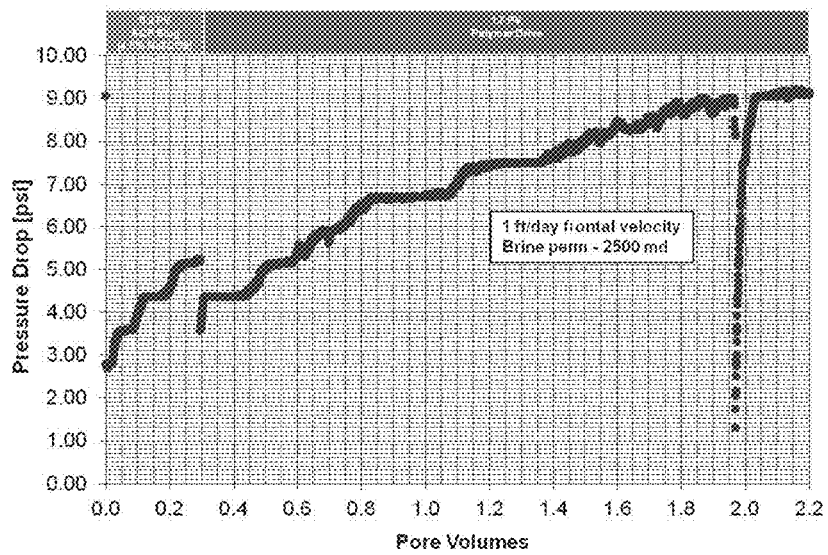

The abbreviations used herein have their conventional meaning within the chemical and biological arts.

Where substituent groups are specified by their conventional chemical formulae, written from left to right, they equally encompass the chemically identical substituents that would result from writing the structure from right to left, e.g., —CH$_2$O— is equivalent to —OCH$_2$—.

The term "alkyl," by itself or as part of another substituent, means, unless otherwise stated, a straight (i.e. unbranched) or branched chain which may be fully saturated, mono- or polyunsaturated and can include di- and multivalent radicals, having the number of carbon atoms designated (i.e. C$_1$-C$_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl". An alkoxy is an alkyl attached to the remainder of the molecule via an oxygen linker (—O—).

The term "alkylene" by itself or as part of another substituent means a divalent radical derived from an alkyl, as exemplified, but not limited, by —CH$_2$CH$_2$CH$_2$CH$_2$—. Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S. The heteroatom(s) O, N, P and S and Si may be placed at any interior position of the heteroalkyl group or at the position at which the alkyl group is attached to the remainder of the molecule. Examples include, but are not limited to, —CH$_2$—CH$_2$—O—CH$_3$, —CH—CH—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, —CH=CH—N(CH$_3$)—CH$_3$, O—CH$_3$, —O—CH$_2$—CH$_3$, and —CN. Up to two heteroatoms may be consecutive, such as, for example, —CH$_2$—NH—OCH$_3$. Similarly, the term "heteroalkylene" by itself or as part of another substituent means a divalent radical derived from heteroalkyl, as exemplified, but not limited by, —CH$_2$—CH$_2$—S—CH—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "cycloalkyl" and "heterocycloalkyl," by themselves or in combination with other terms, represent, unless otherwise stated, cyclic versions of "alkyl" and "heteroalkyl," respectively. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent means a divalent radical derived from a cycloalkyl and heterocycloalkyl, respectively.

The term "aryl" means, unless otherwise stated, a polyunsaturated, aromatic, hydrocarbon substituent which can be a single ring or multiple rings (preferably from 1 to 3 rings) which are fused together (i.e. a fused ring aryl) or linked covalently. A fused ring aryl refers to multiple rings fused together wherein at least one of the fused rings is an aryl ring. The term "heteroaryl" refers to aryl groups (or rings) that contain at least one heteroatom (e.g. N, O, or S), wherein the nitrogen and sulfur atoms are optionally oxidized, and the nitrogen atom(s) are optionally quaternized. Thus, the term "heteroaryl" includes fused ring heteroaryl groups (i.e. multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent means a divalent radical derived from an aryl and heteroaryl, respectively.

The term "oxo" as used herein means an oxygen that is double bonded to a carbon atom.

Each R-group as provided in the formulae provided herein can appear more than once. Where a R-group appears more than once ach R group can be optionally different.

The term "contacting" as used herein, refers to materials or compounds being sufficiently close in proximity to react or interact. For example, in methods of contacting a hydrocarbon material bearing formation and/or a well bore, the term "contacting" includes placing an aqueous composition (e. g. chemical, surfactant or polymer) within a hydrocarbon material bearing formation using any suitable manner known in the art (e.g., pumping, injecting, pouring, releasing, displacing, spotting or circulating the chemical into a well, well bore or hydrocarbon bearing formation).

The terms "unrefined petroleum" and "crude oil" are used interchangeably and in keeping with the plain ordinary usage of those terms. "Unrefined petroleum" and "crude oil"

may be found in a variety of petroleum reservoirs (also referred to herein as a "reservoir," "oil field deposit" "deposit" and the like) and in a variety of forms including oleaginous materials, oil shales (i.e. organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) and market price in comparison to light (or sweet) crude oils. Crude oil may also be characterized by its Equivalent Alkane Carbon Number (EACN).

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified intro three groups, according to the nature of the hydrocarbons they contain. (i) Paraffin based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil as referred to herein is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbon material or active petroleum material. An "oil bank" or "oil cut" as referred to herein, is the crude oil that does not contain the injected chemicals and is pushed by the injected fluid during an enhanced oil recovery process.

"Unrefined petroleum acids" as referred to herein are carboxylic acids contained in active petroleum material (reactive crude oil). The unrefined petroleum acids contain $C_{11}$ to $C_{20}$ alkyl chains, including napthenic acid mixtures. The recovery of such "reactive" oils may be performed using alkali (e.g. NaOH or $Na_2CO_3$) in a non-surfactant composition. The alkali reacts with the acid in the reactive oil to form soap in situ. These in situ generated soaps serve as a source of surfactants enabling efficient oil recovery from the reservoir.

The term "polymer" refers to a molecule having a structure that essentially includes the multiple repetitions of units derived, actually or conceptually, from molecules of low relative molecular mass. In one embodiment, the polymer is an oligomer.

The term "bonded" refers to having at least one of covalent bonding, hydrogen bonding, ionic bonding, Van Der Waals interactions, pi interactions, London forces or electrostatic interactions.

The term "productivity" as applied to a petroleum or oil well refers to the capacity of a well to produce hydrocarbons (e.g. unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g. precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick," having a higher viscosity. More generally, the less viscous a fluid is, the greater its ease of fluidity.

The term "salinity" as used herein, refers to concentration of salt dissolved in a aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

A "light co-solvent" refers to a compound having the ability to increase the solubility of a solute in the presence of an unrefined petroleum acid. Light co-solvents are not surfactants. Light co-solvents have a hydrophobic portion having no more than 6 carbons bound together, a hydrophilic portion (e.g. an alcohol or carboxylate) and optionally an alkoxy portion. Light co-solvents as provided herein include light alcohols, light alkoxy alcohols and light alkoxy carboxylates. Examples of a light co-solvent include, but are not limited to $C_1$-$C_6$ alcohols, $C_1$-$C_6$ alkoxy alcohols, $C_1$-$C_6$ diols, $C_1$-$C_6$ alkoxy diols, $C_1$-$C_6$ alkoxy carboxylates, and $C_1$-$C_6$ alkoxy di-carboxylates.

An "alkali agent" is used according to its conventional meaning and includes basic, ionic salts of alkali metals or alkaline earth metals. Alkali agents as provided herein are typically capable of reacting with an unrefined petroleum acid (e.g. the acid in crude oil (reactive oil)) to form soap (a surfactant salt of a fatty acid) in situ. These in situ generated soaps serve as a source of surfactants causing a reduction of the interfacial tension of the oil in water emulsion, thereby reducing the viscosity of the emulsion. Examples of alkali agents useful for the provided invention include, but are not limited to, sodium hydroxide, sodium carbonate, sodium silicate, sodium metaborate, and EDTA tetrasodium salt.

A "microemulsion" as referred to herein is a thermodynamically stable mixture of oil, water, light co-solvent and alkali agent that may also include additional components such as polymers (e.g. water-soluble polymers) and a salt. In contrast, a "macroemulsion" as referred to herein is a thermodynamically unstable mixture of oil and water that may also include additional components.

II. Compositions

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not limit the scope of the invention.

Provided herein, inter alia, are non-surfactant aqueous compositions and methods of using the same for a variety of applications including enhanced oil recovery. The non-surfactant aqueous compositions provided herein may be used with broad oil concentrations, and at a wide range of salinities, including high salinities such as hard brine. The non-surfactant aqueous compositions according to the embodiments provided herein further promote the formation of emulsions and reduce the viscosity (interfacial viscosity as well as bulk viscosity) of such emulsions, resulting in high oil recovery efficiencies. For the recovery of heavy oils (e.g. oils with less than 20° API gravity or a viscosity of more than 400 mPa s) generally high temperatures are required to decrease the viscosity of the crude oil.

In a first aspect, the present invention provides a non-surfactant aqueous composition including a light co-solvent, a water-soluble polymer and an alkali agent. A non-surfactant aqueous composition as provided herein refers to a composition which does not include a surface active agent having an alkyl chain with more than six carbons. The non-surfactant aqueous compositions provided herein do not include large hydrophobic alkoxy carboxylates, where the hydrophobic portion has at least 8 and up to 150 carbons bound together, a hydrophilic portion (e.g. a carboxylate) and alkoxy portion including up to 210 alkoxy groups bound together, as disclosed in the international application having international application number PCT/US2011/049617.

The non-surfactant aqueous compositions provided herein may include more than one light co-solvent. Thus, in one embodiment, the non-surfactant aqueous composition includes a plurality of different light co-solvents. Where the non-surfactant aqueous composition includes a plurality of different light co-solvents, the different light co-solvents can be distinguished by their chemical (structural) properties. For example, the non-surfactant aqueous composition may include a first light co-solvent, a second light co-solvent and a third light co-solvent, wherein the first co-solvent is chemically different from the second and the third light co-solvent, and the second light co-solvent is chemically different from the third co-solvent. In one embodiment, the plurality of different light co-solvents includes at least two different light alcohols (e.g. a $C_1$-$C_6$ alcohol and a $C_1$-$C_4$ alcohol). In one embodiment, the non-surfactant aqueous composition includes a $C_1$-$C_6$ alcohol and a $C_1$-$C_4$ alcohol. In other embodiments, the plurality of different light co-solvents includes at least two different alkoxy alcohols (e.g. a $C_1$-$C_6$ alkoxy alcohol and a $C_1$-$C_4$ alkoxy alcohol). In other embodiments, the non-surfactant aqueous composition includes a $C_1$-$C_6$ alkoxy alcohol and a $C_1$-$C_4$ alkoxy alcohol. In one embodiment, the plurality of different light co-solvents includes at least two different alkoxy carboxylates (e.g. a $C_1$-$C_6$ alkoxy carboxylate and a $C_1$-$C_4$ alkoxy carboxylate). In other embodiments, the non-surfactant aqueous composition includes a $C_1$-$C_6$ alkoxy carboxylate and a $C_1$-$C_4$ alkoxy carboxylate. In one embodiment, the plurality of different light co-solvents includes at least two light co-solvents selected from the group consisting of light alcohols, alkoxy alcohols and alkoxy carboxylates. For example, the plurality of different light co-solvents may include a light alcohol and an alkoxy alcohol, a light alcohol and an alkoxy carboxylate, or a light alcohol, an alkoxy alcohol and an alkoxy carboxylate.

In one embodiment, the light co-solvent has the formula

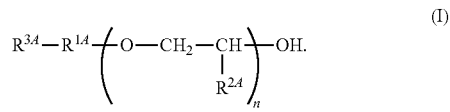
(I)

In formula (I), $R^{1A}$ is unsubstituted $C_1$-$C_6$ alkylene, unsubstituted phenylene, unsubstituted cyclohexylene, unsubstituted cyclopentylene or methyl-substituted cyclopentylene. $R^{2A}$ is independently hydrogen, methyl or ethyl. $R^{3A}$ is independently hydrogen or

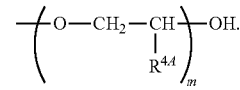

$R^{4A}$ is independently hydrogen, methyl or ethyl. The symbol n is an integer from 0 to 30, and m is an integer from 0 to 30. In one embodiment, n is an integer from 0 to 25. In one embodiment, n is an integer from 0 to 20. In one embodiment, n is an integer from 0 to 15. In one embodiment, n is an integer from 0 to 10. In one embodiment, n is an integer from 0 to 5. In one embodiment, n is 1. In other embodiments, n is 3. In one embodiment, n is 5. In one embodiment, m is an integer from 0 to 25. In one embodiment, m is an integer from 0 to 20. In one embodiment, m is an integer from 0 to 15. In one embodiment, m is an integer from 0 to 10. In one embodiment, m is an integer from 0 to 5. In one embodiment, m is 1. In other embodiments, m is 3. In one embodiment, m is 5. In formula (I) each of $R^{2A}$ and $R^{4A}$ can appear more than once and can be optionally different. For example, in one embodiment where n is 2, $R^{2A}$ appears twice and can be optionally different. In other embodiments, where m is 3, $R^{4A}$ appears three times and can be optionally different.

In other embodiments, the light co-solvent has the formula

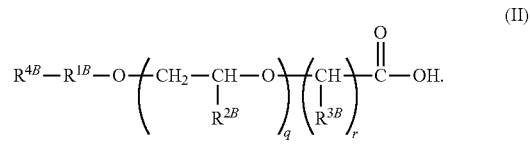
(II)

In formula (II) $R^{1B}$ is unsubstituted $C_1$-$C_6$ alkylene, unsubstituted phenylene, unsubstituted cyclohexylene, unsubstituted cyclopentylene or methyl-substituted cyclopentylene. $R^{2B}$ is independently hydrogen, methyl or ethyl. $R^{3B}$ is independently hydrogen or methyl. The symbol q is an integer from 0 to 30 and r is 1 or 2. In one embodiment, q is an integer from 0 to 25. In one embodiment, q is an integer from 0 to 20. In one embodiment, q is an integer from 0 to 15. In one embodiment, q is an integer from 0 to 10. In one embodiment, q is an integer from 0 to 5. In one embodiment, q is 1. In other embodiments, q is 3. In one embodiment, q is 5. $R^{4B}$ is independently hydrogen or

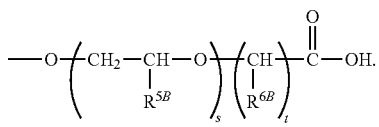

$R^{5B}$ is independently hydrogen, methyl or ethyl. $R^{6B}$ is independently hydrogen or methyl. The symbol s is an integer from 0 to 30, and t is 1 or 2. In one embodiment, s is an integer from 0 to 25. In one embodiment, s is an integer from 0 to 20. In one embodiment, s is an integer from 0 to 15. In one embodiment, s is an integer from 0 to 10. In one embodiment, s is an integer from 0 to 5. In one embodiment, s is 1. In other embodiments, s is 3. In one embodiment, s is 5. In formula (II) each of $R^{2B}$, $R^{3B}$, $R^{5B}$, and $R^{6B}$ can appear more than once and can be optionally different. For example, in one embodiment where q is 2, $R^{2B}$ appears twice and can be optionally different. In other embodiments, where s is 3, $R^{5B}$ appears three times and can be optionally different. In one embodiment, where r is 2, $R^{3B}$ appears three times and can be optionally different.

$R^{1A}$ may be linear or branched unsubstituted alkylene. In one embodiment, $R^{1A}$ of formula (I) is linear unsubstituted $C_1$-$C_6$ alkylene. In one embodiment, $R^{1A}$ of formula (I) is branched unsubstituted $C_1$-$C_6$ alkylene. In other embodiments, $R^{1A}$ of formula (I) is linear unsubstituted $C_2$-$C_6$ alkylene. In other embodiments, $R^{1A}$ of formula (I) is branched unsubstituted $C_2$-$C_6$ alkylene. In other embodiments, $R^{1A}$ of formula (I) is linear unsubstituted $C_3$-$C_6$ alkylene. In other embodiments, $R^{1A}$ of formula (I) is branched unsubstituted $C_3$-$C_6$ alkylene. In other embodiments, $R^{1A}$ of formula (I) is linear unsubstituted $C_4$-$C_6$ alkylene. In other embodiments, $R^{1A}$ of formula (I) is branched unsubstituted $C_4$-$C_6$ alkylene. In other embodiments, $R^{1A}$ of formula (I) is linear unsubstituted $C_4$-alkylene. In other embodiments, $R^{1A}$ of formula (I) is branched unsubstituted $C_4$-alkylene.

$R^{1B}$ may be linear or branched unsubstituted alkylene. In one embodiment, $R^{1B}$ of formula (II) is linear unsubstituted $C_1$-$C_6$ alkylene. In one embodiment, $R^{1B}$ of formula (II) is branched unsubstituted $C_1$-$C_6$ alkylene. In other embodiments, $R^{1B}$ of formula (II) is linear unsubstituted $C_2$-$C_6$ alkylene. In other embodiments, $R^{1B}$ of formula (II) is branched unsubstituted $C_2$-$C_6$ alkylene. In other embodiments, $R^{1B}$ of formula (II) is linear unsubstituted $C_3$-$C_6$ alkylene. In other embodiments, $R^{1B}$ of formula (II) is branched unsubstituted $C_3$-$C_6$ alkylene. In other embodiments, $R^{1B}$ of formula (II) is linear unsubstituted $C_4$-$C_6$ alkylene. In other embodiments, $R^{1B}$ of formula (II) is branched unsubstituted $C_4$-$C_6$ alkylene. In other embodiments, $R^{1B}$ of formula (II) is linear unsubstituted $C_4$-alkylene. In other embodiments, $R^{1B}$ of formula (II) is branched unsubstituted $C_4$-alkylene.

In one embodiment, where $R^{1A}$ is linear or branched unsubstituted alkylene (e.g. branched unsubstituted $C_1$-$C_6$ alkylene), the alkylene is a saturated alkylene (e.g. a linear or branched unsubstituted saturated alkylene or branched unsubstituted $C_1$-$C_6$ saturated alkylene). A "saturated alkylene," as used herein, refers to an alkylene consisting only of hydrogen and carbon atoms that are bonded exclusively by single bonds. Thus, in one embodiment, $R^{1A}$ is linear or branched unsubstituted saturated alkylene. In one embodiment, $R^{1A}$ of formula (I) is linear unsubstituted saturated $C_1$-$C_6$ alkylene. In one embodiment, $R^{1A}$ of formula (I) is branched unsubstituted saturated $C_1$-$C_6$ alkylene. In other embodiments, $R^{1A}$ of formula (I) is linear unsubstituted saturated $C_2$-$C_6$ alkylene. In other embodiments, $R^{1A}$ of formula (I) is branched unsubstituted saturated $C_2$-$C_6$ alkylene. In other embodiments, $R^{1A}$ of formula (I) is linear unsubstituted saturated $C_3$-$C_6$ alkylene. In other embodiments, $R^{1A}$ of formula (I) is branched unsubstituted saturated $C_3$-$C_6$ alkylene. In other embodiments, $R^{1A}$ of formula (I) is linear unsubstituted $C_4$-$C_6$ alkylene. In other embodiments, $R^{1A}$ of formula (I) is branched unsubstituted saturated $C_4$-$C_6$ alkylene. In other embodiments, $R^{1A}$ of formula (I) is linear unsubstituted saturated $C_4$-alkylene. In other embodiments, $R^{1A}$ of formula (I) is branched unsubstituted saturated $C_4$-alkylene.

In one embodiment, where $R^{1B}$ is linear or branched unsubstituted alkylene (e.g. branched unsubstituted $C_1$-$C_6$ alkylene), the alkylene is a saturated alkylene (e.g. a linear or branched unsubstituted saturated alkylene or branched unsubstituted $C_1$-$C_6$ saturated alkylene). A "saturated alkylene," as used herein, refers to an alkylene consisting only of hydrogen and carbon atoms that are bonded exclusively by single bonds. Thus, in one embodiment, $R^{1B}$ is linear or branched unsubstituted saturated alkylene. In one embodiment, $R^{1B}$ of formula (II) is linear unsubstituted $C_1$-$C_6$ alkylene. In one embodiment, $R^{1B}$ of formula (II) is branched unsubstituted saturated $C_1$-$C_6$ alkylene. In other embodiments, $R^{1B}$ of formula (II) is linear unsubstituted saturated $C_2$-$C_6$ alkylene. In other embodiments, $R^{1B}$ of formula (II) is branched unsubstituted saturated $C_2$-$C_6$ alkylene. In other embodiments, $R^{1B}$ of formula (II) is linear unsubstituted saturated $C_3$-$C_6$ alkylene. In other embodiments, $R^{1B}$ of formula (II) is branched unsubstituted saturated $C_3$-$C_6$ alkylene. In other embodiments, $R^{1B}$ of formula (II) is linear unsubstituted $C_4$-$C_6$ alkylene. In other embodiments, $R^{1B}$ of formula (II) is branched unsubstituted saturated $C_4$-$C_6$ alkylene. In other embodiments, $R^{1B}$ of formula (II) is linear unsubstituted saturated $C_4$-alkylene. In other embodiments, $R^{1B}$ of formula (II) is branched unsubstituted saturated $C_4$-alkylene.

In one embodiment, $R^{1A}$ of formula (I) is substituted or unsubstituted cycloalkylene or unsubstituted arylene. In one embodiment, $R^{1A}$ of formula (I) is $R^{7A}$-substituted or unsubstituted cyclopropylene, wherein $R^{7A}$ is $C_1$-$C_3$ alkyl. In other embodiments, $R^{1A}$ of formula (I) is $R^{8A}$-substituted or unsubstituted cyclobutylene, wherein $R^{8A}$ is $C_1$-$C_2$ alkyl. In other embodiments, $R^{1A}$ of formula (I) is $R^{9A}$-substituted or unsubstituted cyclopentylene, wherein $R^{9A}$ is $C_1$-alkyl. In other embodiments, $R^{1A}$ of formula (I) is $R^{10A}$-substituted or unsubstituted cyclopentylene, wherein $R^{10A}$ is unsubstituted cyclohexyl. In one embodiment, $R^{1A}$ of formula (I) is unsubstituted phenylene, unsubstituted cyclohexylene, unsubstituted cyclopentylene or methyl-substituted cyclopentylene.

In one embodiment, $R^{1B}$ of formula (II) is substituted or unsubstituted cycloalkylene or unsubstituted arylene. In one embodiment, $R^{1B}$ of formula (II) is $R^{7B}$-substituted or unsubstituted cyclopropylene, wherein $R^{7B}$ is $C_1$-$C_3$ alkyl. In other embodiments, $R^{1B}$ of formula (II) is $R^{8B}$-substituted or unsubstituted cyclobutylene, wherein $R^{8B}$ is $C_1$-$C_2$ alkyl. In other embodiments, $R^{1B}$ of formula (II) is $R^{9B}$-substituted or unsubstituted cyclopentylene, wherein $R^{9B}$ is $C_1$-alkyl. In other embodiments, $R^{1B}$ of formula (II) is $R^{10B}$-substituted or unsubstituted cyclopentylene, wherein $R^{10B}$ is unsubstituted cyclohexyl. In one embodiment, $R^{1B}$ of formula (II) is unsubstituted phenylene, unsubstituted cyclohexylene, unsubstituted cyclopentylene or methyl-substituted cyclopentylene.

In one embodiment, —$R^{1A}$—$R^{3A}$ of formula (I) is $C_1$-$C_6$ alkyl, unsubstituted phenyl, unsubstituted cyclohexyl, unsubstituted cyclopentyl or a methyl-substituted cycloalkyl.

In one embodiment, the light co-solvent has the structure of formula

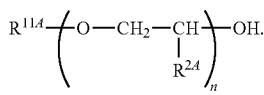
(VI)

In formula (VI), $R^{11A}$ is $C_1$-$C_6$ alkyl, unsubstituted phenyl, unsubstituted cyclohexyl, unsubstituted cyclopentyl or a methyl-substituted cycloalkyl.

In one embodiment, n and m are independently 1 to 20. In other embodiments, n and m are independently 1 to 15. In other embodiments, n and m are independently 1 to 10. In one embodiment, n and m are independently 1 to 6. In one embodiment, n and m are independently 1. In one embodiment, q and s are independently 1 to 20. In other embodiments, q and s are independently 1 to 15. In other embodiments, q and r are independently 1 to 10. In one embodiment, q and r are independently 1 to 6. In other embodiments, q and r are independently 3.

The light co-solvent included in the compositions provided herein may be a monohydric or a dihydric alkoxy alcohol (e.g. $C_1$-$C_6$ alkoxy alcohol or $C_1$-$C_6$ alkoxy diol). Where the light co-solvent is a monohydric alcohol, the light co-solvent has the formula (I) and $R^{3A}$ is hydrogen. Where the light co-solvent is a diol, the light co-solvent has the formula (I) and $R^{3A}$ is

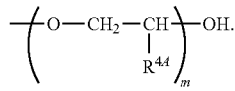

In one embodiment, $R^{1A}$ is linear unsubstituted $C_4$ alkylene and n is 3. In one embodiment, the light co-solvent is triethyleneglycol butyl ether. In other embodiments, the light co-solvent is tetraethylene glycol. In further embodiments, m is 3. In one embodiment, $R^{1A}$ is linear unsubstituted $C_4$ alkylene and n is 5. In one embodiment, the light co-solvent is pentaethyleneglycol n-butyl ether. In further embodiments, m is 5. In one embodiment, $R^{1A}$ is branched unsubstituted $C_4$ alkylene and n is 1. In one embodiment, the light-co-solvent is ethyleneglycol iso-butyl ether. In further embodiments, m is 1. In one embodiment, $R^{1A}$ is branched unsubstituted $C_4$ alkylene and n is 3. In one embodiment, the light co-solvent is triethyleneglycol iso-butyl ether. In further embodiments, m is 3. In one embodiment, the light co-solvent is ethylene glycol or propylene glycol. In other embodiments, the light co-solvent is ethylene glycol alkoxylate or propylene glycol alkoxylate. In one embodiment, the light co-solvent is propylene glycol diethoxylate or propylene glycoltriethoxylate. In one embodiment, the light co-solvent is propylene glycol tetraethoxylate.

In the structure of formula (I), $R^{3A}$ may be hydrogen or

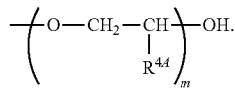

Thus in one embodiment, $R^{3A}$ is

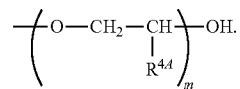

The light co-solvent of the compositions provided herein may be an alkoxy carboxylate or an alkoxy dicarboxylate (e.g. $C_1$-$C_6$ alkoxy carboxylate or $C_1$-$C_6$ alkoxy dicarboxylate). Where the light co-solvent is an alkoxy carboxylate, the light co-solvent has the formula (II), and $R^{4B}$ is hydrogen. Where the light co-solvent is an alkoxy dicarboxylate, the light co-solvent has the formula (II) and $R^{4B}$ is

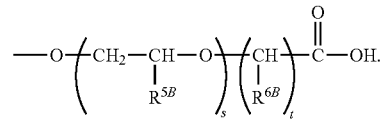

In one embodiment, $R^{1B}$ is linear unsubstituted $C_4$ alkylene and q is 3. In some further embodiments, s is 3. In other embodiments, $R^{1B}$ is linear unsubstituted $C_4$ alkylene and q is 5. In some further embodiments, s is 5. In one embodiment, $R^{1B}$ is branched unsubstituted $C_4$ alkylene and q is 1. In some further embodiments, s is 1. In one embodiment, $R^{1B}$ is branched unsubstituted $C_4$ alkylene and q is 3. In some further embodiments, s is 3.

In one embodiment, —$R^{1B}$—$R^{4B}$ of formula (II) is $C_1$-$C_6$ alkyl, unsubstituted phenyl, unsubstituted cyclohexyl, unsubstituted cyclopentyl or a methyl-substituted cycloalkyl.

In one embodiment, the light co-solvent has the structure of formula

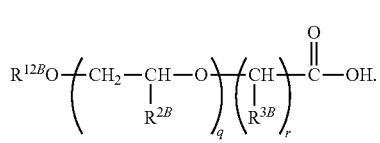
(VII)

In formula (VII), $R^{12B}$ is $C_1$-$C_6$ alkyl, unsubstituted phenyl, unsubstituted cyclohexyl, unsubstituted cyclopentyl or a methyl-substituted cycloalkyl.

In the structure of formula (II), $R^{4B}$ may be independently hydrogen or

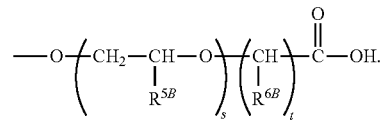

Thus, in one embodiment, $R^{4B}$ is

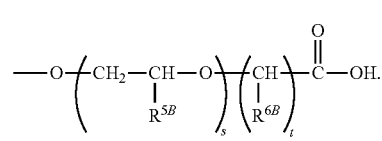

In one embodiment, the light co-solvent provided herein may be an alcohol or diol ($C_1$-$C_6$ alcohol or $C_1$-$C_6$ diol). Where the light co-solvent is an alcohol, the light co-solvent has a structure of formula (I), where $R^{3.4}$ is hydrogen and n is 0. Where the light co-solvent is a diol, the light co-solvent has a structure of formula (I), where $R^{3.4}$ is

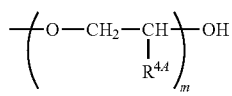

and n and m are 0. Thus, in one embodiment, n and m are independently 0. In one embodiment, $R^{1.4}$ is linear or branched unsubstituted $C_1$-$C_6$ alkylene. In other embodiments, $R^{1.4}$ is linear or branched unsubstituted $C_2$-$C_6$ alkylene. In one embodiment, $R^{1.4}$ is linear or branched unsubstituted $C_2$-$C_6$ alkylene. In one embodiment $R^{1.4}$ is linear or branched unsubstituted $C_3$-$C_6$ alkylene. In other embodiments, $R^{1.4}$ is linear or branched unsubstituted $C_4$-$C_6$ alkylene. In one embodiment, $R^{1.4}$ is linear or branched unsubstituted $C_4$-alkylene. In one embodiment, $R^{1.4}$ is branched unsubstituted butylene. In one embodiment, the light co-solvent has the structure of formula

In other embodiments, the light co-solvent has the structure of formula

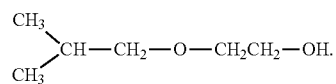

In one embodiment, the light co-solvent has the structure of formula

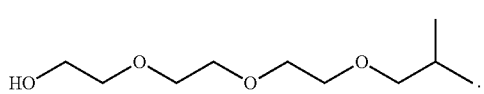

The light co-solvent as used herein is a compound within the non-surfactant aqueous composition that may function as an interfacial viscosity agent when the aqueous composition is in contact with a crude oil (e.g. an unrefined petroleum). An "interfacial viscosity agent" as provided herein is an agent that together with an alkali agent of the non-surfactant aqueous composition facilitates the formation of soap in situ from carboxylic acids contained in the unrefined oil (also referred to herein as unrefined oil acid). By contacting the alkali agent with the carboxylic acid in the crude oil (e.g. by delivering the alkali agent more efficiently than water alone) the light co-solvent facilitates the generation of soap in situ. The formation of soap in situ promotes the formation of emulsions (both microemulsion and macroemulsion) providing for efficient production of the crude oil by lowering the interfacial tension between the water and the crude oil. The light co-solvent provided herein may further allow for the formation of microemulsions between the unrefined petroleum and the non-surfactant aqueous composition. The light co-solvent may decrease the interfacial viscosity and thus help transform highly viscous macroemulsions to less viscous microemulsions. The light co-solvent may further break the macroemulsoins or prevent the formation of macroemulsion entirely. Thus, as an interfacial viscosity agent the light co-solvent having the formula (I), (II), (III), (IV), (V), (VI) or (VII) provided herein, may act to increase the flow of crude oil through the solid material (e.g. solid rock) toward production wells. The light co-solvents according to the embodiments provided herein may also be referred to herein as "light co-solvents provided herein" or "the light co-solvent of the present invention." Any one or combination of a light co-solvent of formulas (I), (II), (III), (IV), (V), (VI) or (VII) is useful in the methods and compositions provided herein. In one embodiment, the alkali agent is NaOH. In other embodiments, the alkali agent is $Na_2CO_3$.

In another embodiment, the light co-solvent is present in an alkali stabilizing amount. An "alkali stabilizing amount" means that the light co-solvent is present in an amount in which the alkali agent degrades at a slower rate in the presence of the light co-solvent than in the absence of the light co-solvent. The rate of degradation may be 10%, 20%, 30%, 40%, 50%, 60%, 70%, 80%, 90% or 100% slower. In one embodiment, the rate of degradation is 2, 3, 4, 5, 6, 7, 8, 9 or 10 times slower.

In another embodiment, the light co-solvent is present in a soap-solubilizing amount. A "soap-solubilizing amount" means that the light co-solvent is present in an amount in which the soap formed in situ by the alkali agent and the acid in the crude oil (e.g. unrefined pretoleum acid) is more soluble in the presence of the light co-solvent than in the absence of the light co-solvent. The solubilization may be 10%, 20%, 30%, 40%, 50%, 60%, 70%, 80%, 90% or 100% higher. In some embodiment, the solubilization is 2, 3, 4, 5, 6, 7, 8, 9 or 10 times higher. In one embodiment, the light co-solvent is present in an amount sufficient to increase the solubility of the in situ generated soap in the non-surfactant aqueous composition relative to the absence of the light co-solvent. In other words, in the presence of a sufficient amount of the light co-solvent, the solubility of the in situ generated soap in the non-surfactant aqueous composition is higher than in the absence of the light co-solvent. The light co-solvent may increase or decrease the optimum salinity of the non-surfactant aqueous composition. In one embodiment, the light co-solvent may reduce the sensitivity of the optimum salinity to the oil concentration.

In one embodiment, the non-surfactant aqueous composition includes a gas. For instance, the gas may be combined with the non-surfactant aqueous composition to reduce its mobility by decreasing the liquid flow in the pores of the solid material (e.g. rock). In one embodiment, the gas may be supercritical carbon dioxide, nitrogen, natural gas or mixtures of these and other gases. The gas (e.g. methane) may reduce the oil viscosity and thus synergistically promote the efficient production of oil by both reducing the mobility of the non-surfactant aqueous composition and increase the mobility of the oil. In one embodiment, the gas and the light co-solvent are present in a synergistic viscosity decreasing amount. A "synergistic viscosity decreasing amount" as used herein, means that a light co-solvent and a gas are present in amounts in which the viscosity decreasing activity of the light co-solvent and the gas combined is greater than the additive viscosity decreasing activity of the light co-solvent individually and the gas individually. In some cases, the viscosity decreasing activity of the light co-solvent and the gas combination is 10%, 20%, 30%, 40%, 50%, 60%, 70%, 80%, 90% or 100% more than the additive viscosity decreasing activity of the light co-solvent individually and the gas individually. In one embodiment, the viscosity decreasing activity of the light co-solvent and the gas combination is 2, 3, 4, 5, 6, 7, 8, 9 or 10 times more than the additive viscosity decreasing activity of the light co-solvent individually and the gas individually.

In one embodiment, the non-surfactant aqueous compositions provided herein are particularly useful for the recovery of viscous oils (e.g. oils with a viscosity of more than about 40 mPa s and less than about 400 mPa s) and heavy oils (e.g. oils with less than less than 20° API gravity or a viscosity of more than about 400 mPa s). For the recovery of viscous oils and particularly heavy oils, high temperatures may be required in order to decrease the viscosity of the unrefined petroleum as well as of the emulsions. Some surfactants are unstable at high temperatures, resulting in loss of interfacial activity and thus less oil recovery. The light co-solvents included in the non-surfactant aqueous compositions provided herein are stable at high (i.e. viscosity decreasing) temperatures. A viscosity decreasing temperature as referred to herein is a temperature decreasing the viscosity of a crude oil relative to its naturally occurring viscosity in the reservoir. In one embodiment, the non-surfactant aqueous composition has a viscosity decreasing temperature. In some further embodiments, the viscosity decreasing temperature is equal to or less than about 200° C.

In one embodiment, the light co-solvents provided herein are nonionic. In one embodiment, the light co-solvents provided herein are not sensitive to hardness and salinity compared to typical anionic surfactants commonly used. In one embodiment, the non-surfactant aqueous composition has a salinity of about 250,000 ppm. The total range of salinity (total dissolved solids in the brine) may be 100 in saturated brine (about 260,000 ppm). The non-surfactant aqueous composition may include seawater, brine from an aquifer, river or lake. The aqueous combination may further include salt to increase the salinity. In one embodiment, the salt is NaCl, KCl, $CaCl_2$, $MgCl_2$, $Na_2SO_4$ or $Na_2CO_3$.

The non-surfactant aqueous composition may include more than 10 ppm of divalent cations combined. In one embodiment, the aqueous composition includes more than 10 ppm of $Ca^{2+}$ and $Mg^{2+}$ combined. The non-surfactant aqueous composition may include more than 100 ppm of divalent cations combined. In one embodiment, the non-surfactant aqueous composition includes more than 1000 ppm of $Ca^{2+}$ and $Mg^{2+}$ combined. In one embodiment, the non-surfactant aqueous composition includes more than 3000 ppm of $Ca^{2+}$ and $Mg^{2+}$ combined.

In one embodiment, the non-surfactant aqueous composition includes more than 10 ppm of cations such as divalent cations. In other embodiments, the non-surfactant aqueous composition includes more than 100 ppm of cations such as divalent cations. In one embodiment, the non-surfactant aqueous composition includes more than 1000 ppm of cations such as divalent cations. In one embodiment, the divalent cations are $Ba^{2+}$, $Fe^{2+}$, $Ca^{2+}$ and $Mg^{2+}$.

In one embodiment, the non-surfactant aqueous composition has an acid neutralizing pH. An acid neutralizing pH is a pH that allows for the formation of soap in situ from the acids contained in the crude oil and the alkali agent present in a non-surfactant aqueous composition. In one embodiment, the neutralizing pH is approximately equal to or higher than pH 8. In other embodiments, the neutralizing pH is at least 9.0.

Where the non-surfactant aqueous composition includes hard brine, chelating agents may be included to prevent the divalent cations from precipitating the soap. Examples of chelating agents useful herein are without limitation, EDTA (ethylenediaminetetraacetic acid), EDTA sodium salt, and tetrasodium iminodisuccinat. In one embodiment, the non-surfactant aqueous composition further includes a chelating agent. In some further embodiments, the non-surfactant aqueous composition further includes a hard brine.

In another aspect, an emulsion composition is provided including an unrefined petroleum phase and a non-surfactant aqueous phase. The non-surfactant aqueous phase includes a light co-solvent and an alkali agent. The light co-solvent is a compound according to the embodiments provided herein (e.g. a compound of formula (I), (II), (III), (IV), (V), (VI) or (VII)). In one embodiment, the non-surfactant aqueous phase includes the components set forth in the non-surfactant aqueous composition provided above. For example, in one embodiment, the aqueous phase contains a light co-solvent and an alkali agent. The aqueous phase may include a combination of one or more light co-solvents. In one embodiment, the viscosity of the emulsion composition is less than the viscosity in the absence of the light co-solvent. In one embodiment, the viscosity of the emulsion composition is less than 3 times the viscosity of an unrefined petroleum (e.g. the unrefined petroleum which makes up the unrefined petroleum phase of the emulsion composition). In other embodiments, the viscosity of the emulsion composition is less than 30 centipoise. In other embodiments, the viscosity of the emulsion composition is less than 200 centipoise. The light co-solvents present in the non-surfactant aqueous phase transform (break down) the initially formed macroemulsion into stable microemulsions thereby allowing for efficient recovery of the crude oil in the petroleum phase. In one embodiment, the emulsion composition is a microemulsion.

In other embodiments, the oil and water solubilization ratios are insensitive to the combined concentration of divalent metal cations (e.g. $Ca^{+2}$ and $Mg^{+2}$) within the non-surfactant aqueous phase. In other embodiments, the oil and water solubilization ratios are insensitive to the salinity of the water or to all of the specific electrolytes contained in the water. The term "insensitive" used in the context of this paragraph means that the solubilization ratio tends not to change (e.g. tends to remain constant) as the concentration of divalent metal cations and/or salinity of water changes. In one embodiment, the change in the solubilization ratios are less than 5%, 10%, 20%, 30%, 40%, or 50% over a divalent metal cation concentration range of 10 ppm, 100 ppm, 1000 ppm or 10,000 ppm. In another embodiment, the change in the solubilization ratios are less than 5%, 10%, 20%, 30%, 40%, or 50% over a salinity concentration range of 10 ppm, 100 ppm, 1000 ppm or 10,000 ppm.

In one embodiment, the emulsion composition further includes a water-soluble polymer. In one embodiment, the water-soluble polymer may be a biopolymer such as xanthan gum or scleroglucan, a synthetic polymer such as polyacrylamide, hydrolyzed polyarcrylamide or co-polymers of acrylamide and acrylic acid, 2-acrylamido 2-methyl propane sulfonate or N-vinyl pyrrolidone, a synthetic polymer such as polyethylene oxide, or any other high molecular weight polymer soluble in water or brine. In one embodiment, the water-soluble polymer is a partially (e.g. 20%, 25%, 30%, 35%, 40%, 45%) hydrolyzed anionic polyacrylamide. In some further embodiment, the water-soluble polymer has a molecular weight of approximately about $8 \times 10^6$. In some other further embodiment, the water-soluble polymer has a molecular weight of approximately about $18 \times 10^6$. Non-limiting examples of commercially available polymers useful for the invention including embodiments provided herein are Florpaam 3330S and Florpaam 3336S.

In one embodiment, the light co-solvent is present in an amount sufficient to increase the solubility of in situ generated soap in the non-surfactant aqueous phase relative to the absence of the light co-solvent. In other words, in the presence of a sufficient amount of the light co-solvent, the solubility of in situ generated soap in the non-surfactant aqueous composition is higher than in the absence of the light co-solvent. Where the light co-solvent increases the solubility of in situ generated soap, the in situ generated soap is more soluble in the presence of the light co-solvent than in the absence of the light co-solvent. The solubility of the in situ generated soap may be 10%, 20%, 30%, 40%, 50%, 60%, 70%, 80%, 90% or 100% higher. In one embodiment, the solubilization is 2, 3, 4, 5, 6, 7, 8, 9 or 10 times higher.

The light co-solvent provided herein may increase the solubility of the water-soluble polymer in the non-surfactant aqueous composition needed to thicken it to prevent an unstable displacement (e.g. fingers) and thus to efficiently displace the oil through the rock. In one embodiment, the light co-solvent is present in an amount sufficient to increase the solubility of the water-soluble polymer in the emulsion composition relative to the absence of the light co-solvent. In other words, in the presence of a sufficient amount of the light co-solvent, the solubility of the polymer in the emulsion composition is higher than in the absence of the light co-solvent. Where the light co-solvent increases the solubility of the polymer in the emulsion composition, the polymer is more soluble in the presence of the light co-solvent than in the absence of the light co-solvent. The solubility of the polymer in the emulsion composition may be 10%, 20%, 30%, 40%, 50%, 60%, 70%, 80%, 90% or 100% higher. In one embodiment, the solubilization is 2, 3, 4, 5, 6, 7, 8, 9 or 10 times higher.

The emulsion composition containing a light co-solvent and an alkali agent may further include a water-soluble polymer and/or a gas. In one embodiment, the emulsion composition includes a polymer or a gas. In one embodiment, the emulsion composition further includes a gas. In one embodiment, the emulsion composition includes a polymer and a gas. In some further embodiments, the emulsion composition has a viscosity decreasing temperature. In other embodiments, the emulsion composition includes at least one light co-solvent, an alkali agent and a polymer. In some further embodiments, the emulsion composition a gas. In some further embodiments, the emulsion composition has a viscosity decreasing temperature. In one embodiment, the viscosity decreasing temperature is equal to or less than about 200° C. In one embodiment, the viscosity decreasing temperature is equal to or less than about 150° C. In one embodiment, the viscosity decreasing temperature is equal to or less than about 100° C. In one embodiment, the viscosity decreasing temperature is equal to or less than about 80° C. In one embodiment, the viscosity decreasing temperature is equal to or less than about 60° C.

In one embodiment, the emulsion composition has a salinity of about 300,000 ppm. In other embodiments, the emulsion composition has a salinity of about 250,000 ppm. In one embodiment, the emulsion composition has a salinity of about 200,000 ppm. In other embodiments, the emulsion composition has a salinity of about 150,000 ppm. In one embodiment, the emulsion composition has a salinity of about 100,000 ppm. In one embodiment, the emulsion composition has a salinity of about 50,000 ppm.

In one embodiment, the emulsion composition has an acid neutralizing pH. In further embodiments, the acid neutralizing pH is approximately equal to or higher than pH 8. In one embodiment, the emulsion composition further includes a chelating agent. In some further embodiments, the emulsion composition includes a hard brine. In one embodiment, the unrefined petroleum phase includes a heavy oil. In some further embodiments, the viscosity of the heavy oil is equal to or more than 40 mPa s.

The emulsion composition of the present invention include light co-solvents according to the embodiments described above. Thus, in one embodiment, the light co-solvent has a structure according to formula (I), (II), (III), (IV), (V), (VI) or (VII). In one embodiment, the light co-solvent has the formula (I). In other embodiments, the light co-solvent has the formula (II). In one embodiment, the light co-solvent has the formula (III). In one embodiment, the light co-solvent has the formula (IV). In one embodiment, the light co-solvent has the formula (V). In one embodiment, the light co-solvent has the formula (VI). In one embodiment, the light co-solvent has the formula (VII).

III. Methods

In another aspect, a method of displacing an unrefined active petroleum material in contact with a solid material is provided. The method includes contacting an unrefined active petroleum material with a non-surfactant aqueous composition, wherein the unrefined active petroleum material is in contact with a solid material. The unrefined active petroleum material is allowed to separate from the solid material thereby displacing the unrefined active petroleum material in contact with the solid material. The non-surfactant aqueous composition includes a light co-solvent (as described herein) and an alkali agent. In other embodiments, the non-surfactant aqueous composition further includes a water-soluble polymer. In one embodiment, the light co-solvent has the formula (I). In other embodiments, the light co-solvent has the formula (II). In one embodiment, the light co-solvent has the formula (III). In one embodiment, the light co-solvent has the formula (IV). In one embodiment, the light co-solvent has the formula (V). In one embodiment, the light co-solvent has the formula (VI). In one embodiment, the light co-solvent has the formula (VII). The light co-solvent may be present in a non-surfactant aqueous composition or an emulsion composition as described above.

The solid material may be a natural solid material (i.e. a solid found in nature such as rock). The natural solid material may be found in a petroleum reservoir. In one embodiment, the method is an enhanced oil recovery method. In one embodiment, the natural solid material is rock or regolith. The natural solid material may be a geological formation such as clastics or carbonates. The natural solid material may be either consolidated or unconsolidated material or mixtures thereof. The unrefined active petroleum material may be trapped or confined by "bedrock" above or below the natural solid material. The unrefined active petroleum material may be found in fractured bedrock or porous natural solid material. In other embodiments, the regolith is soil.

In one embodiment, an emulsion forms after the contacting. The emulsion thus formed may be the emulsion composition as described above. In one embodiment, the method includes allowing an unrefined petroleum acid within the unrefined petroleum material to enter into the emulsion (e.g. emulsion composition), thereby converting the unrefined petroleum acid into a surfactant. In other words, where the unrefined petroleum acid converts into a surfactant, the oil may be mobilized and therefore separated from the solid material.

In another aspect, a method of converting an unrefined active petroleum acid into a surfactant is provided. The method includes contacting an unrefined active petroleum material with the non-surfactant aqueous composition, thereby forming an emulsion in contact with the unrefined active petroleum material. An unrefined active petroleum acid within the unrefined active petroleum material is allowed to enter the emulsion, thereby converting the unrefined active petroleum acid into a surfactant. The non-surfactant aqueous composition includes a light co-solvent as described herein and alkali agent. In some further embodiments, the non-surfactant aqueous composition includes a water-soluble polymer. In one embodiment, the light co-solvent has the formula (I). In other embodiments, the light co-solvent has the formula (II). In one embodiment, the light co-solvent has the formula (III). In one embodiment, the light co-solvent has the formula (IV). In one embodiment, the light co-solvent has the formula (V). In one embodiment, the light co-solvent has the formula (VI). In one embodiment, the light co-solvent has the formula (VII). Thus, in one embodiment, the non-surfactant aqueous composition is the non-surfactant aqueous composition described above. And in one embodiment, the emulsion is the emulsion composition described above. An unrefined petroleum acid within the unrefined petroleum material is allowed to enter the emulsion, thereby converting (e.g. mobilizing) the unrefined petroleum acid into a surfactant. In one embodiment, the unrefined active petroleum material is a petroleum reservoir.

IV. Examples

Phase Behavior Procedures

Phase Behavior Screening: Phase behavior studies have been used to characterize chemicals for EOR. There are many benefits in using phase behavior as a screening method. Phase Behavior studies are used to determine: (1) the effect of electrolytes; (2) oil solubilization and ITT reduction, (3) microemulsion densities; (4) microemulsion viscosities; (5) coalescence times; (6) optimal light co-solvent/alkali agent formulations; and/or (7) optimal properties for recovering oil from cores and reservoirs.

Thermodynamically stable phases can form with oil, water and non-surfactant aqueous mixtures. In situ generated soaps form micellar structures at concentrations at or above the critical micelle concentration (CMC). The emulsion coalesces into a separate phase at the oil-water interface and is referred to as a microemulsion. A microemulsion is a surfactant-rich distinct phase consisting of in situ generated soaps, oil and water and light co-solvent, alkali agent and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (light co-solvent, alcohol, electrolyte), oil, which is sometimes characterized by its equivalent alkane carbon number (EACN), and light co-solvent structure, which is sometimes characterized by its hydrophilic-lipophilic balance (HLB). The phase transition was first characterized by Winsor (1954) into three regions: Type I—excess oleic phase, Type III—aqueous, microemulsion and oleic phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio ($\sigma^*$), and the electrolyte concentration where the optimum solubilization ratio occurs is referred to as the Optimal Salinity (S*). Since no surfactant is added, the only surfactant present is the in-situ generated soap. For the purpose of calculating a solubilization ratio, one can assume a value for soap level using TAN(total acid number) and an approximate molecular weight for the soap.

Determining Interfacial Tension

Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the Chun Huh equation, where IFT varies with the inverse square of the solubilization ratio:

$$\gamma = \frac{C}{\sigma^2} \quad (1)$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of light co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment

Phase behavior experiments are created with the following materials and equipment.

Mass Balance: Mass balances are used to measure chemicals for mixtures and determine initial saturation values of cores.

Water Deionizer: Deionized (DI) water is prepared for use with all the experimental solutions using a Nanopure filter system. This filter uses a recirculation pump and monitors the water resistivity to indicate when the ions have been removed. Water is passed through a 0.45 micron filter to eliminate undesired particles and microorganisms prior to use.

Borosilicate Pipettes: Standard 5 mL borosilicate pipettes with 0.1 mL markings are used to create phase behavior scans as well as run dilution experiments with aqueous solutions. Ends are sealed using a propane and oxygen flame.

Pipette Repeater: An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch: A mixture of propane and oxygen gas is directed through a Bernz-O-Matic flame nozzle to create a hot flame about V2 inch long. This torch is used to flame-seal the glass pipettes used in phase behavior experiments.

Convection Ovens: Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature. pH Meter: An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations

The oil and water solubilization ratios are calculated from interface measurements taken from phase behavior pipettes. These interfaces are recorded over time as the mixtures approached equilibrium and the volume of any macroemulsions that initially formed decreased or disappeared.

Phase Behavior Methodology

The methods for creating, measuring and recording observations are described in this section. Scans are made using a variety of electrolyte mixtures described below. Oil is added to most aqueous non-surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of samples. Phase behavior samples are made by first preparing non-surfactant aqueous stock solutions and combining them with brine stock solutions in order to observe the behavior of the mixtures over a range of salinities.

Solution Preparation. Non-surfactant aqueous stock solutions are based on active weight-percent co-solvent. The masses of light co-solvent, alkali agent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Co-solvent Stock. The chemicals being tested are first mixed in a concentrated stock solution that usually consisted of light co-solvent, alkali agent and/or polymer along with de-ionized water. The quantity of chemical added is calculated based on activity and measured by weight percent of total solution. Initial experiments are at about 1-3% light co-solvent so that the volume of the middle microemulsion phase would be large enough for accurate measurements assuming a solubilization ratio of at least 10 at optimum salinity.

Polymer Stock. Often these stocks were quite viscous and made pipetting difficult so they are diluted with de-ionized water accordingly to improve ease of handling. Mixtures with polymer are made only for those light co-solvent formulations that showed good behavior and merited additional study for possible testing in core floods. Consequently, scans including polymer are limited since they are done only as a final evaluation of compatibility with the light co-solvent.

Pipetting Procedure. Phase behavior components are added volumetrically into 5 ml pipettes using an Eppendorf Repeater Plus or similar pipetting instrument. Light co-solvent, alkali agent and brine stocks are mixed with DI water into labeled pipettes and brought to temperature before agitation. Almost all of the phase behavior experiments are initially created with a water oil ratio (WOR) of 1:1, which involves mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition. Consideration must be given to the addition of the components since the concentrations are often several folds greater than the final concentration. Therefore, an order is established to prevent any adverse effects resulting from light co-solvent, alkali agent or polymer coming into direct contact with the concentrated electrolytes. The desired sample compositions are made by combining the stocks in the following order: (1) Electrolyte stock(s); (2) De-ionized water; (3) light co-solvent stock; (4) alkali agent stock; (5) Polymer stock; and (6) Crude oil or hydrocarbon.

Initial Observations. Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing. The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times to provide adequate mixing. Tubes are observed for low tension upon mixing by looking at droplet size and how uniform the mixture appeared. Then the solutions are allowed to equilibrate over time and interface levels are recorded to determine equilibration time and light co-solvent/alkali agent performance.

Measurements and Observations. Phase behavior experiments are allowed to equilibrate in an oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces. The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

V. Tables

TABLE 1

| | Crude oil properties. | | |
|---|---|---|---|
| Oil ID | #1 | #2 | #3 |
| Viscosity, cP | 166 @ 38 C. | 30-55 @ 90 C. | 13.9 @ 55 C. |
| Acid number, mg KOH/g | ~5 | Not available (highly reactive) | 6.64 |
| API Gravity | 19.08° | 17.8°-23° | 24° |

TABLE 2

List of core flood conditions and formulations.

| | | | |
|---|---|---|---|
| Core | Bentheimer sandstone | Berea sandstone | Berea sandstone |
| Temperature, °C. | 38 | 65 | 85 |
| Oil ID | #1 | #2 | #2 |
| Brine Permeability, mD | 2500 | 150 | 149 |
| PV, mL | 140 | 106 | 110 |
| Water flood residual oil, Sorw | 0.46 | 0.43 | 0.41 |
| ACP Slug | 1.5% n-butyl-5EO 6000 ppm Na2CO3 in synthetic brine (6934 ppm TDS) 2750 ppm 3630s Viscosity: 100 cP @ 5 s−1, 38 C. Slug size: 0.5 PV | 1.0% secondary butanol 35000 ppm Na2CO3 5000 ppm 3630s in 2000 ppm NaCl Viscosity: 76 cP @ 10 s−1, 65 C. Slug size: 0.3 PV | 1.0% iso-butyl-1EO 25000 ppm Na2CO3 5000 ppm 3630s in 2000 ppm NaCl Viscosity: 125 cP @ 10 s−1, 85 C. Slug size: 0.3 PV |
| PD | 2250 ppm 3630s in synthetic brine Viscosity: 140 cP @ 5 s−1, 38 C. | 2800 ppm 3630s in 2000 ppm NaCl Viscosity: 120 cP @ 10 s−1, 65 C. | 3000 ppm 3630s in 2000 ppm NaCl Viscosity: 113 cP @ 10 s−1, 85 C. |
| Cum. Oil Recovery (% Sorw) | 70 | 87.8 | 96.6 |
| Chemical flood residual oil, Sorc | 0.135 | 0.052 | 0.014 |
| Core | Berea sandstone | Berea sandstone | Berea sandstone |
| Temperature, °C. | 65 | 85 | 55 |
| Oil ID | #2 | #2 | #3 |
| Brine Permeability, mD | 300 | 323 | 177 |
| PV, mL | 109 | 108 | 117 |
| Water flood residual oil, Sorw | 0.46 | 0.41 | 0.41 |
| ACP Slug | 1.0% iso-butyl-1EO 30000 ppm Na2CO3 4750 ppm 3630s in 2000 ppm NaCl Viscosity: 108 cP @ 10 s−1, 65 C. Slug size: 0.3 PV | 1.0% iso-butyl-1EO 15000 ppm Na2CO3 4750 ppm 3630s in 2000 ppm NaCl Viscosity: 134 cP @ 10 s−1, 85 C. Slug size: 0.3 PV | 1.0% TEGBE 45000 ppm Na2CO3 in synthetic brine (55400 ppm TDS) 3500 ppm 3330s Viscosity: 27 cP @ 10 s−1, 55 C. Slug size: 0.3 PV |
| PD | 2800 ppm 3630s in 2000 ppm NaCl Viscosity: 123 cP @ 10 s−1, 65 C. | 3000 ppm 3630s in 2000 ppm NaCl Viscosity: 123 cP @ 10 s−1, 85 C. | 2500 ppm 3330s in synthetic brine (10400 ppm TDS) Viscosity: 27 cP @ 10 s−1, 55 C. |
| Cum. Oil Recovery (% Sorw) | 87.2 | 95.2 | 80.7 |
| Chemical flood residual oil, Sorc | 0.0596 | 0.0196 | 0.08 |

TABLE 3

Structures of exemplary co-solvent compounds.

| | |
|---|---|
| Compound 1 Tetraethyleneglycol | |
| Compound 2 Iso butanol | |
| Compound 3 Pentaethyleneglycol n-butyl ether | |

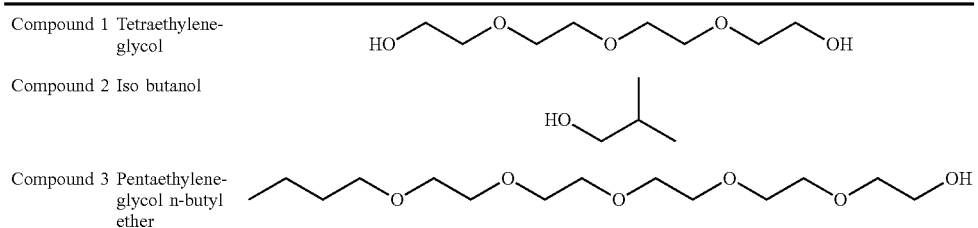

TABLE 3-continued

Structures of exemplary co-solvent compounds.

| Compound 4 | Ethyleneglycol iso-butyl ether | 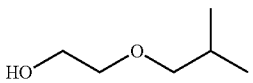 |
| Compound 5 | Triethylene-glycol iso-butyl ether (TEGBE) | 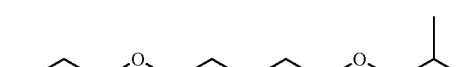 |
| Compound 6 | Ethylene glycol |  |
| Compound 7 | Propylene glycol | 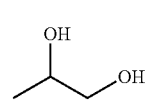 |
| Compound 8 | n-butyl-5EO | $CH_3-CH_2CH_2CH_2-(O-CH_2CH_2)_5-OH$ |
| Compound 9 | Iso-butyl-1EO | 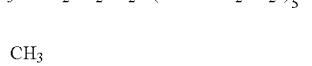 |

VI. Embodiments

Embodiment 1

A non-surfactant aqueous composition comprising a light co-solvent, a water-soluble polymer and an alkali agent.

Embodiment 2

The non-surfactant aqueous composition of embodiment 1, comprising a plurality of different light co-solvents.

Embodiment 3

The non-surfactant aqueous composition of embodiments 1 or 2, wherein the light co-solvent has the formula:

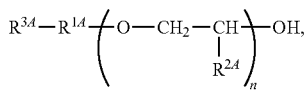

wherein $R^{1A}$ is unsubstituted $C_1$-$C_6$ alkylene, unsubstituted phenylene, unsubstituted cyclohexylene, unsubstituted cyclopentylene or methyl-substituted cyclopentylene; $R^{2A}$ is independently hydrogen, methyl or ethyl; $R^{3A}$ is independently hydrogen or

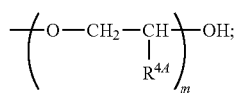

$R^{4A}$ is independently hydrogen, methyl or ethyl; n is an integer from 0 to 30, and m is an integer from 0 to 30.

Embodiment 4

The non-surfactant aqueous composition of embodiments 1 or 2, wherein the light co-solvent has the formula:

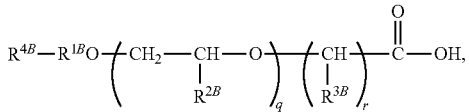

wherein $R^{1B}$ is unsubstituted $C_1$-$C_6$ alkylene, unsubstituted phenylene, unsubstituted cyclohexylene, unsubstituted cyclopentylene or methyl-substituted cyclopentylene; $R^{2B}$ is independently hydrogen, methyl or ethyl; $R^{3B}$ is independently hydrogen or methyl; q is an integer from 0 to 30; r is 1 or 2; $R^{4B}$ is independently hydrogen or

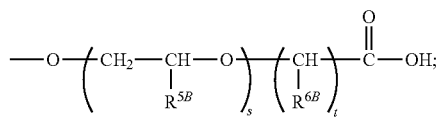

$R^{5B}$ is independently hydrogen, methyl or ethyl; $R^{6B}$ is independently hydrogen or methyl; s is an integer from 0 to 30, and t is 1 or 2.

Embodiment 5

The non-surfactant aqueous composition of embodiments 3 or 4, wherein $R^{1A}$ or $R^{1B}$ is linear or branched unsubstituted $C_1$-$C_6$ alkylene.

Embodiment 6

The non-surfactant aqueous composition of embodiments 3 or 4, wherein $R^{1A}$ or $R^{1B}$ is linear or branched unsubstituted $C_2$-$C_6$ alkylene.

Embodiment 7

The non-surfactant aqueous composition of embodiments 3 or 4, wherein $R^{1A}$ or $R^{1B}$ is linear or branched unsubstituted $C_3$-$C_6$ alkylene.

Embodiment 8

The non-surfactant aqueous composition of embodiments 3 or 4, wherein $R^{1A}$ or $R^{1B}$ is linear or branched unsubstituted $C_4$-$C_6$ alkylene.

Embodiment 9

The non-surfactant aqueous composition of embodiment 3 or 4, wherein $R^{1A}$ or $R^{1B}$ is linear or branched unsubstituted $C_4$ alkylene.

Embodiment 10

The non-surfactant aqueous composition of any one of embodiments 3 or 5-9 wherein n and m are independently 1 to 20.

Embodiment 11

The non-surfactant aqueous composition of any one of embodiments 3 or 5-9, wherein n and m are independently 1 to 6.

Embodiment 12

The non-surfactant aqueous composition of any one of embodiments 4-9, wherein q and s are independently 1 to 20.

Embodiment 13

The non-surfactant aqueous composition of any one of embodiments 4-9, wherein q and s are independently 1 to 6.

Embodiment 14

The non-surfactant aqueous composition of any one of embodiments 3 or 5-11, wherein $R^{1A}$ is linear unsubstituted $C_4$ alkylene and n is 3.

Embodiment 15

The non-surfactant aqueous composition of embodiment 14, wherein m is 3.

Embodiment 16

The non-surfactant aqueous composition of any one of embodiments 3 or 5-11, wherein $R^{1A}$ is linear unsubstituted $C_4$ alkylene and n is 5.

Embodiment 17

The non-surfactant aqueous composition of embodiment 16, wherein miss.

Embodiment 18

The non-surfactant aqueous composition of any one of embodiments 3 or 5-1, wherein $R^{1A}$ is branched unsubstituted $C_4$ alkylene and n is 1.

Embodiment 19

The non-surfactant aqueous composition of embodiment 18, wherein m is 1.

Embodiment 20

The non-surfactant aqueous composition of any one of embodiments 3 or 5-11, wherein $R^{1A}$ is branched unsubstituted $C_4$ alkylene and n is 3.

Embodiment 21

The non-surfactant aqueous composition of embodiment 20, wherein m is 3.

Embodiment 22

The non-surfactant aqueous composition of any one of embodiments 4-9, 12 or 13, wherein $R^{1B}$ is linear unsubstituted $C_4$ alkylene and q is 3.

Embodiment 23

The non-surfactant aqueous composition of embodiment 22, wherein s is 3.

Embodiment 24

The non-surfactant aqueous composition of any one of embodiments 4-9, 12 or 13, wherein $R^{1B}$ is linear unsubstituted $C_4$ alkylene and q is 5.

Embodiment 25

The non-surfactant aqueous composition of embodiment 24, wherein s is 5.

Embodiment 26

The non-surfactant aqueous composition of any one of embodiments 4-9, 12 or 13, wherein $R^{1B}$ is branched unsubstituted $C_4$ alkylene and q is 1.

Embodiment 27

The non-surfactant aqueous composition of embodiment 26, wherein s is 1.

Embodiment 28

The non-surfactant aqueous composition of any one of embodiments 4-9, 12 or 13, wherein $R^{1B}$ is branched unsubstituted $C_4$ alkylene and q is 3.

Embodiment 29

The non-surfactant aqueous composition of embodiment 28, wherein s is 3.

Embodiment 30

The non-surfactant aqueous composition of embodiment 3, wherein n and m are independently 0.

Embodiment 31

The non-surfactant aqueous composition of embodiment 9, wherein $R^{1A}$ is linear or branched unsubstituted $C_1$-$C_6$ alkylene.

Embodiment 32

The non-surfactant aqueous composition of embodiments 30 or 31 wherein $R^{14}$ is linear or branched unsubstituted $C_2$-$C_6$ alkylene.

Embodiment 33

The non-surfactant aqueous composition of any one of embodiments 9-32, wherein $R^{14}$ is linear or branched unsubstituted $C_3$-$C_6$ alkylene.

Embodiment 34

The non-surfactant aqueous composition of any one of embodiments 9-33, wherein $R^{14}$ is linear or branched unsubstituted $C_4$-$C_6$ alkylene.

Embodiment 35

The non-surfactant aqueous composition of any one of embodiments 9-34, wherein $R^{14}$ is linear or branched unsubstituted $C_4$-alkylene.

Embodiment 36

The non-surfactant aqueous composition of any one of embodiments 9-35, wherein $R^{14}$ is branched unsubstituted butylene.

Embodiment 37

The non-surfactant aqueous composition of any one of embodiments 3-36, wherein the alkali agent is NaOH.

Embodiment 38

The non-surfactant aqueous composition of any one of embodiments 3-36, wherein the alkali agent is $Na_2CO_3$.

Embodiment 39

The non-surfactant aqueous composition of any one of embodiments 3-38, further comprising a gas.

Embodiment 40

The non-surfactant aqueous composition of any one of the preceding embodiments, wherein the non-surfactant aqueous composition has a viscosity decreasing temperature.

Embodiment 41

The non-surfactant aqueous composition of embodiment 40, wherein said viscosity decreasing temperature is equal to or less than about 200° C.

Embodiment 42

The non-surfactant aqueous composition of any one of the preceding embodiments, having a salinity of about 250,000 ppm.

Embodiment 43

The non-surfactant aqueous composition of any one of the preceding embodiments, having an acid neutralizing pH.

Embodiment 44

The non-surfactant aqueous composition of embodiment 43, wherein the neutralizing pH is approximately equal to or higher than pH 8.

Embodiment 45

The non-surfactant aqueous composition of embodiment 43, wherein the neutralizing pH is at least 9.0.

Embodiment 46

The non-surfactant aqueous composition of any one of the preceding embodiments, further comprising a chelating agent.

Embodiment 47

The non-surfactant aqueous composition of embodiment 46, further comprising a hard brine.

Embodiment 48

An emulsion composition comprising an unrefined petroleum phase and a non-surfactant aqueous phase, wherein said non-surfactant aqueous phase comprises a light co-solvent and alkali agent.

Embodiment 49

The emulsion composition of embodiment 48, wherein the emulsion composition is a microemulsion.

Embodiment 50

The emulsion composition of embodiment 48, further comprising a water-soluble polymer.

Embodiment 51

The emulsion composition of any one of embodiments 48-50, wherein said light co-solvent is present in an amount sufficient to increase the solubility of in situ generated soap in said non-surfactant aqueous phase relative to the absence of said light co-solvent.

Embodiment 52

The emulsion composition of embodiments 50 or 51, wherein said light co-solvent is present in an amount sufficient to increase the solubility of the polymer in said non-surfactant aqueous phase relative to the absence of said light co-solvent.

Embodiment 53

The emulsion composition of any one of embodiments 48-52, further comprising a gas.

Embodiment 54

The emulsion composition of any one of embodiments 48-53, wherein the emulsion composition has a viscosity decreasing temperature.

Embodiment 55

The emulsion composition of embodiment 54, wherein said viscosity decreasing temperature is equal to or less than about 200° C.

Embodiment 56

The emulsion composition of any one of embodiments 48-55, having a salinity of about 250,000 ppm.

Embodiment 57

The emulsion composition of any one of embodiments 48-56, having an acid neutralizing pH.

Embodiment 58

The emulsion composition of embodiment 57, wherein the acid neutralizing pH is approximately equal to or higher than pH 8.

Embodiment 59

The emulsion composition of any one of embodiments 48-58, further comprising a chelating agent.

Embodiment 60

The emulsion composition of embodiment 59, further comprising a hard brine.

Embodiment 61

The emulsion composition of any one of embodiments 48-60, wherein said unrefined petroleum phase comprises a heavy oil.

Embodiment 62

The emulsion composition of any one of embodiments 48 to 61, wherein said light co-solvent has the formula:

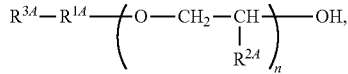

wherein $R^{1A}$ is unsubstituted $C_1$-$C_6$ alkylene, unsubstituted phenylene, unsubstituted cyclohexylene, unsubstituted cyclopentylene or methyl-substituted cyclopentylene; $R^{2A}$ is independently hydrogen, methyl or ethyl; $R^{3A}$ is independently hydrogen or

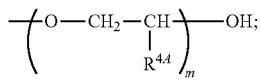

$R^{4A}$ is independently hydrogen, methyl or ethyl; n is an integer from 0 to 30, and m is an integer from 0 to 30.

Embodiment 63

The emulsion composition of any one of embodiments 48 to 61, wherein said light co-solvent has the formula:

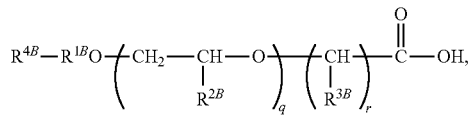

wherein $R^{1B}$ is unsubstituted $C_1$-$C_6$ alkylene, unsubstituted phenylene, unsubstituted cyclohexylene, unsubstituted cyclopentylene or methyl-substituted cyclopentylene; $R^{2B}$ is independently hydrogen, methyl or ethyl; $R^{3B}$ is independently hydrogen or methyl; q is an integer from 0 to 30; r is 1 or 2; $R^4$ is independently hydrogen or

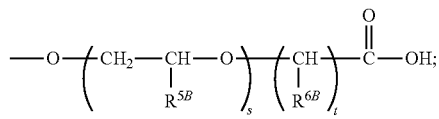

$R^{5B}$ is independently hydrogen, methyl or ethyl; $R^{6B}$ is independently hydrogen or methyl; s is an integer from 0 to 30, and t is 1 or 2.

Embodiment 64

A method of displacing an unrefined active petroleum material in contact with a solid material, said method comprising: (i) contacting an unrefined active petroleum material with a non-surfactant aqueous composition, wherein said unrefined active petroleum material is in contact with a solid material; (ii) allowing said unrefined active petroleum material to separate from said solid material thereby displacing said unrefined active petroleum material in contact with said solid material.

Embodiment 65

The method of embodiment 64, wherein said non-surfactant aqueous composition comprises a light co-solvent and alkali agent.

Embodiment 66

The method of embodiment 65, wherein said non-surfactant aqueous composition further comprises a water-soluble polymer.

Embodiment 67

The method of any one of embodiments 64 to 66, wherein said light co-solvent has the formula

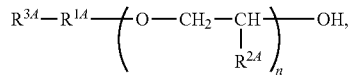

wherein $R^{1A}$ is unsubstituted $C_1$-$C_6$ alkylene, unsubstituted phenylene, unsubstituted cyclohexylene, unsubstituted cyclopentylene or methyl-substituted cyclopentylene; $R^{2A}$ is independently hydrogen, methyl or ethyl; $R^{3A}$ is independently hydrogen or

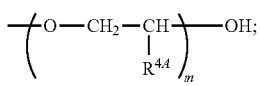

$R^{4A}$ is independently hydrogen, methyl or ethyl; n is an integer from 0 to 30, and m is an integer from 0 to 30.

Embodiment 68

The method of any one of embodiments 64 to 66, wherein said light co-solvent has the formula:

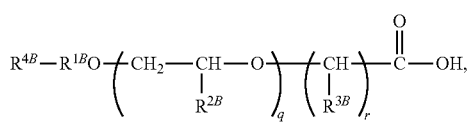

wherein $R^{1B}$ is unsubstituted $C_1$-$C_6$ alkylene, unsubstituted phenylene, unsubstituted cyclohexylene, unsubstituted cyclopentylene or methyl-substituted cyclopentylene; $R^{2B}$ is independently hydrogen, methyl or ethyl; $R^{3B}$ is independently hydrogen or methyl; q is an integer from 0 to 30; r is 1 or 2; R' is independently hydrogen or

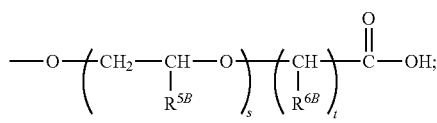

$R^{5B}$ is independently hydrogen, methyl or ethyl; $R^6$ is independently hydrogen or methyl; s is an integer from 0 to 30, and t is 1 or 2.

Embodiment 69

The method of embodiment 64, wherein said method is an enhanced oil recovery method.

Embodiment 70

The method of embodiment 64, wherein said natural solid material is rock or regolith.

Embodiment 71

The method of embodiment 70, wherein said regolith is soil.

Embodiment 72

The method of embodiment 15, wherein an emulsion forms after said contacting.

Embodiment 73

The method of embodiment 72, wherein said method further comprises allowing an unrefined active petroleum acid within said unrefined active petroleum material to enter into said emulsion, thereby converting said unrefined active petroleum acid into a surfactant.

Embodiment 74

A method of converting an unrefined active petroleum acid into a surfactant, said method comprising: (i) contacting an unrefined active petroleum material with the non-surfactant aqueous composition, thereby forming an emulsion in contact with said unrefined active petroleum material; and (ii) allowing an unrefined active petroleum acid within said unrefined active petroleum material to enter said emulsion, thereby converting said unrefined active petroleum acid into a surfactant.

Embodiment 75

The method of embodiment 74, wherein said non-surfactant aqueous composition comprises a light co-solvent and alkali agent.

Embodiment 76

The method of embodiment 75, further comprising a water-soluble polymer.

Embodiment 77

The method of embodiment 74, wherein said light co-solvent has the formula:

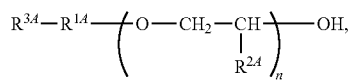

wherein $R^{1A}$ is unsubstituted $C_1$-$C_6$ alkylene, unsubstituted phenylene, unsubstituted cyclohexylene, unsubstituted cyclopentylene or methyl-substituted cyclopentylene; $R^{2A}$ is independently hydrogen, methyl or ethyl; $R^{3A}$ is independently hydrogen or

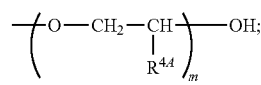

$R^{4A}$ is independently hydrogen, methyl or ethyl; n is an integer from 0 to 30, and m is an integer from 0 to 30.

Embodiment 78

The method of embodiment 74, wherein said light co-solvent has the formula:

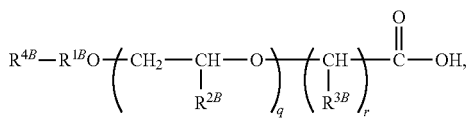

wherein $R^{1B}$ is unsubstituted $C_1$-$C_6$ alkylene, unsubstituted phenylene, unsubstituted cyclohexylene, unsubstituted cyclopentylene or methyl-substituted cyclopentylene; $R^{2B}$ is independently hydrogen, methyl or ethyl; $R^{3B}$ is independently hydrogen or methyl; q is an integer from 0 to 30; r is 1 or 2; R' is independently hydrogen or

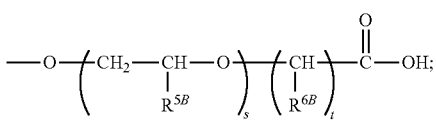

$R^{5B}$ is independently hydrogen, methyl or ethyl; R' is independently hydrogen or methyl; s is an integer from 0 to 30, and t is 1 or 2.

Embodiment 79

The method of embodiment 74, wherein said unrefined active petroleum material is a petroleum reservoir.

What is claimed is:

1. A method of displacing an unrefined active petroleum material in contact with a solid material, the method comprising:
   (i) injecting a non-surfactant aqueous composition into a petroleum reservoir to form a mixture, wherein the non-surfactant aqueous composition comprises a light co-solvent, a water-soluble polymer, and an alkali agent,
   wherein the light co-solvent is defined by the formula:

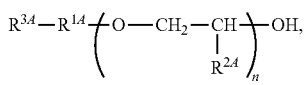

wherein $R^{1A}$ is unsubstituted $C_1$-$C_6$ alkylene, unsubstituted phenylene, unsubstituted cyclohexylene, unsubstituted cyclopentylene, or methyl-substituted cyclopentylene;
$R^{2A}$ is independently for each occurrence hydrogen, methyl, or ethyl;
$R^{3A}$ is hydrogen or

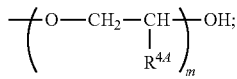

$R^{4A}$ is independently for each occurrence hydrogen, methyl, or ethyl;
n is an integer from 1 to 30; and
m is an integer from 0 to 3;
wherein $R^{3A}$ together with $R^{1A}$ include six or less carbon atoms,
wherein the alkali agent is selected from sodium carbonate, sodium metaborate, and combinations thereof and is present in an amount of from 0.6 to 4.5 wt %, based on the weight of the non-surfactant composition, and
wherein the unrefined active petroleum material is in contact with a solid material;
   (ii) allowing the unrefined active petroleum material to separate from the solid material thereby displacing the unrefined active petroleum material in contact with the solid material, and
   (iii) recovering the unrefined active petroleum material, and
wherein the method does not include adding a surfactant to the aqueous composition.

2. The method of claim 1, wherein $R^{1A}$ is linear unsubstituted $C_4$ alkylene and n is 5.

3. The method of claim 1, wherein $R^{1A}$ is branched unsubstituted $C_4$ alkylene and n is 1.

4. The method of claim 1, wherein m is 1.

5. The method of claim 1, wherein m is 0.

6. The method of claim 1, wherein the mixture is an emulsion.

7. The method of claim 6, wherein the emulsion composition is a microemulsion.

8. The method of claim 6, wherein the method further comprises allowing an unrefined petroleum acid within the unrefined petroleum material to enter into the emulsion, thereby converting the unrefined petroleum acid into a surfactant.

9. The method of claim 1, wherein the water-soluble polymer is a polyacrylamide, 2-acrylamido 2-methyl propane sulfonate, N-vinyl pyrrolidone, xanthan gum, scleroglucan or polyethylene oxide.

10. The method of claim 9, wherein the water soluble polymer comprises polyacrylamide, wherein the polyacrylamide is a hydrolyzed polyacrylamide, partially hydrolyzed anionic polyacrylamide or a co-polymer of acrylamide.

11. The method of claim 1, wherein the non-surfactant aqueous composition comprises hard water.

12. The method of claim 1, wherein the non-surfactant aqueous composition has a salinity of at least 50,000 ppm.

13. The method of claim 1, wherein the non-surfactant aqueous composition comprises hard brine.

* * * * *